(12) United States Patent
Ueda et al.

(10) Patent No.: US 7,507,041 B2
(45) Date of Patent: Mar. 24, 2009

(54) IMAGING DEVICE

(75) Inventors: Toshiaki Ueda, Saitama (JP); Takayoshi Yamasaki, Tokyo (JP); Tetsuya Okuchi, Tokyo (JP); Kouta Nagano, Tokyo (JP); Tomonori Watanabe, Tokyo (JP); Shin Miyashita, Kanagawa (JP); Atsuko Koyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 376 days.

(21) Appl. No.: 11/299,790

(22) Filed: Dec. 13, 2005

(65) Prior Publication Data

US 2006/0165407 A1    Jul. 27, 2006

(30) Foreign Application Priority Data

Dec. 27, 2004 (JP) ............................. 2004-375753

(51) Int. Cl.
*G03B 17/02* (2006.01)
*H01M 2/10* (2006.01)
*H05K 1/14* (2006.01)

(52) U.S. Cl. .................. 396/423; 396/539; 348/375; 429/100; 361/737

(58) Field of Classification Search ......... 396/535–539; 348/373–376; 429/96–100; 361/737, 740, 361/747; 235/486
See application file for complete search history.

(56) References Cited

U.S. PATENT DOCUMENTS

| 1,750,983 | A | * | 3/1930 | Zell | ............................. 132/297 |
| 4,863,812 | A | * | 9/1989 | Ueda et al. | ...................... 429/9 |
| 5,032,859 | A | * | 7/1991 | Akimoto et al. | .............. 396/132 |
| 5,598,305 | A | * | 1/1997 | Nakanishi et al. | ......... 360/96.61 |
| 5,867,739 | A | * | 2/1999 | Lamphron | ...................... 396/6 |
| 6,601,766 | B2 | * | 8/2003 | Nakagawa et al. | ........... 235/451 |
| 7,085,295 | B2 | * | 8/2006 | Gurski et al. | ................ 370/520 |
| 2002/0186978 | A1 | * | 12/2002 | Tanaka et al. | ................ 396/539 |
| 2004/0212727 | A1 | * | 10/2004 | Ariga | .......................... 348/375 |
| 2004/0264955 | A1 | * | 12/2004 | Fujii | ........................... 396/448 |
| 2007/0148537 | A1 | * | 6/2007 | Nakatani et al. | ............. 429/100 |

FOREIGN PATENT DOCUMENTS

| JP | 06-193332 | 7/1994 |
| JP | 3037774 | 3/1997 |
| JP | 09-306449 | 11/1997 |
| JP | 2000-165714 | 6/2000 |
| JP | 2003-257395 | 9/2003 |
| JP | 2004-079453 | 3/2004 |
| JP | 2004-79543 | 3/2004 |
| JP | 2004-177629 | 6/2004 |
| JP | 2004-178948 | 6/2004 |

* cited by examiner

*Primary Examiner*—W. B. Perkey
(74) *Attorney, Agent, or Firm*—Oblon, Spivak, McClelland, Maier & Neustadt, P.C.

(57) ABSTRACT

Disclosed herein is an imaging device including a battery compartment having an opening for insertion and ejection of a battery, a battery release lever for allowing the insertion of the battery into the battery compartment through the opening and the ejection of the battery from the battery compartment through the opening, and a battery lid for openably closing the opening of the battery compartment. The battery release lever is located adjacent to the battery lid so as not to be substantially covered with the battery lid in its closed condition. Accordingly, the position of the battery release lever can be visually recognized even in the closed condition of the battery lid.

7 Claims, 19 Drawing Sheets

IMAGING DEVICE

CROSS REFERENCES TO RELATED APPLICATIONS

The present invention contains subject matter related to Japanese Patent Application JP 2004-375753 filed with the Japanese Patent Office on Dec. 27, 2004, the entire contents of which being incorporated herein by reference.

BACKGROUND OF THE INVENTION

The present invention relates to electronic equipment, e.g., an imaging device such as a digital camera (DSC), and more particularly to an imaging device including a battery compartment having an opening for insertion and ejection of a battery, an improved battery release lever for allowing the insertion of the battery into the battery compartment through the opening and the ejection of the battery from the battery compartment through the opening, and an improved battery lid for openably closing the opening of the battery compartment.

An imaging device such as a digital camera uses a battery as a power source. The battery is inserted from an opening formed through a housing of the imaging device into a battery compartment defined in the housing, and unintentional ejection of the battery inserted in the battery compartment is prevented by a battery release lever. In this condition, the opening is closed by a battery lid (see Japanese Patent Laid-open No. Hei 9-22685, for example).

SUMMARY OF THE INVENTION

FIG. 23 shows an imaging device in the prior art. In this imaging device, a battery lid 201 in its closed condition is laid on a battery release lever 202 so as to fully cover it. Accordingly, this imaging device has the following problems.
(1) The size of a battery compartment 204 defined in a housing 203 of the imaging device in a direction along the depth of the battery compartment 204, i.e., the size of the battery compartment 204 in a direction of insertion of a battery is increased by an amount corresponding to the superimposition of the battery lid 201 on the battery release lever 202.
(2) The battery release lever 202 is fully covered with the battery lid 201 in its closed condition, so that the position of the battery release lever 202 cannot be visually recognized in the closed condition of the battery lid 201.

It is accordingly desirable for the present invention to provide an imaging device which can be reduced in size in a direction of insertion of a battery.

Similarly, it is also desirable for the present invention to provide an imaging device in which the position of a battery release lever can be visually recognized even in the closed condition of a battery lid.

In accordance with an embodiment of the present invention, there is provided an imaging device including a flat box-shaped housing having a first main surface, a second main surface opposite to the first main surface, and a first end surface connecting the first main surface and the second main surface; an imaging lens provided on the first main surface; a monitor provided on the second main surface; a battery compartment defined between the first main surface and the second main surface, the battery compartment having an opening exposed to the first end surface for insertion and ejection of a battery; a battery release lever provided on the first end surface for allowing the insertion of the battery into the battery compartment through the opening and the ejection of the battery from the battery compartment through the opening; and a battery lid provided on the first end surface for openably closing the opening of the battery compartment; the battery release lever being located adjacent to the battery lid so as not to be substantially covered with the battery lid in its closed condition.

With this configuration, the battery release lever and the battery lid are not superimposed each other. Accordingly, as compared with the prior art configuration that the battery release lever and the battery lid are superimposed each other, the dimension in a direction of superimposition of these members can be reduced. Further, the battery release lever is located adjacent to the battery lid so as to be exposed to the first end surface of the housing even in the closed condition of the battery lid. Accordingly, the position of the battery release lever can be easily visually recognized.

Preferably, the battery release lever is formed at its one end with a battery engaging portion; the battery release lever is slidably mounted on the first end surface so as to be movable between an advanced position where the battery engaging portion of the battery release lever is advanced to close a part of the opening of the battery compartment and a retracted position where the battery engaging portion is retracted to open the part of the opening; and the battery release lever is normally biased toward the advanced position by a spring.

When the battery release lever is retracted against a biasing force of the spring, the battery is allowed to be inserted into the battery compartment. After inserting the battery into the battery compartment, a force of retracting the battery release lever is removed, so that the battery release lever is automatically returned to the advanced position by the biasing force of the spring to thereby prevent unintentional ejection of the battery from the battery compartment.

Preferably, the battery lid is pivotably mounted through a shaft to the housing; and when the battery lid is rotated in a first direction about the shaft, the battery lid is laid on the first end surface to close the opening of the battery compartment, whereas when the battery lid is rotated in a second direction opposite to the first direction about the shaft, the battery lid is opened to be laid on a strap hook provided on the first end surface, so that the battery lid is supported at its open position by the strap hook.

When the battery lid is opened, the battery lid comes into abutment against the strap hook to thereby limit an open angle of the battery lid. Accordingly, excess opening of the battery lid can be prevented by the strap hook for protection.

More preferably, the shaft is provided by a metal bar having elasticity; and one end portion of the shaft is formed as a spring portion for biasing the battery lid against the first end surface in the closed condition of the battery lid and for biasing the battery lid against the strap hook in the open condition of the battery lid; the spring portion being formed by bending the shaft.

The spring portion for maintaining the battery lid in its closed condition or open condition is formed by bending one end portion of the shaft for pivotably mounting the battery lid to the housing. That is, the spring portion is integral with the shaft. Accordingly, as compared with the case of using a spring independent of the shaft to maintain the battery lid in its closed condition or open condition, the number of parts can be reduced to thereby reduce a product cost.

More preferably, the battery release lever is formed with a battery lid engaging portion; and the battery lid is formed with a release lever engaging portion adapted to engage with the battery lid engaging portion of the battery release lever; whereby when the battery lid is in its closed condition, the battery lid engaging portion of the battery release lever is engaged with the release lever engaging portion of the battery lid to thereby prevent the retraction of the battery release lever in the closed condition of the battery lid.

Even when a retraction force is erroneously applied to the battery release lever in the closed condition of the battery lid, the battery lid engaging portion of the battery release lever comes into engagement with the release lever engaging portion of the battery lid, thereby preventing the retraction of the battery release lever in the closed condition of the battery lid.

More preferably, the battery compartment is provided at its innermost end with battery contact terminals having a spring force for slightly ejecting the battery; and the battery engaging portion of the battery release lever has a battery displacing surface for further ejecting the battery slightly ejected by the spring force of the battery contact terminals.

The battery slightly ejected by the battery contact terminals can be further ejected by the battery displacing surface of the battery engaging portion of the battery release lever. Accordingly, the battery can be easily ejected from the battery compartment.

In accordance with another embodiment of the present invention, there is provided electronic equipment including a battery compartment having an opening for insertion and ejection of a battery; a battery release lever for allowing the insertion of the battery into the battery compartment through the opening and the ejection of the battery from the battery compartment through the opening; and a battery lid for openably closing the opening of the battery compartment; the battery release lever being located adjacent to the battery lid so as not to be substantially covered with the battery lid in its closed condition.

With this configuration, the battery release lever and the battery lid are not superimposed each other. Accordingly, as compared with the prior art configuration that the battery release lever and the battery lid are superimposed each other, the dimension in a direction of superimposition of these members can be reduced. Further, the battery release lever is located adjacent to the battery lid so as to be exposed to the outside of the housing even in the closed condition of the battery lid. Accordingly, the position of the battery release lever can be easily visually recognized.

In accordance with a further embodiment of the present invention, there is provided electronic equipment including a component compartment having an opening for insertion and ejection of a component; a component release lever for allowing the insertion of the component into the component compartment through the opening and the ejection of the component from the component compartment through the opening; and a lid for openably closing the opening of the component compartment; the component release lever being located adjacent to the lid so as not to be substantially covered with the lid in its closed condition.

With this configuration, the component release lever and the lid are not superimposed each other. Accordingly, as compared with the prior art configuration such that the component release lever and the lid are superimposed each other, the dimension in a direction of superimposition of these members can be reduced. Further, the component release lever is located adjacent to the lid so as to be exposed to the outside of the housing even in the closed condition of the lid. Accordingly, the position of the component release lever can be easily visually recognized.

Other objects and features of the invention will be more fully understood from the following detailed description and appended claims when taken with the accompanying drawings.

DETAILED DESCRIPTION OF THE PREFERRED EMBODIMENTS

An imaging device according to a preferred embodiment of the present invention will now be described with reference to the drawings in the order of (1) General Configuration of Imaging Device, (2) Configuration of Housing, (3) Configuration of Barrier, (4) Configuration of Rollers, (5) Configuration of Barrier Slide Guides, (6) Configuration of Toggle Spring, (7) Configuration of Battery Lid, (8) Configuration of Battery Release Lever, (9) Configuration of Strap Hook, (10) Operation of Battery Lid and Battery Release Lever, and (11) Other Preferred Embodiments.

(1) General Configuration of Imaging Device

Figure 1A:
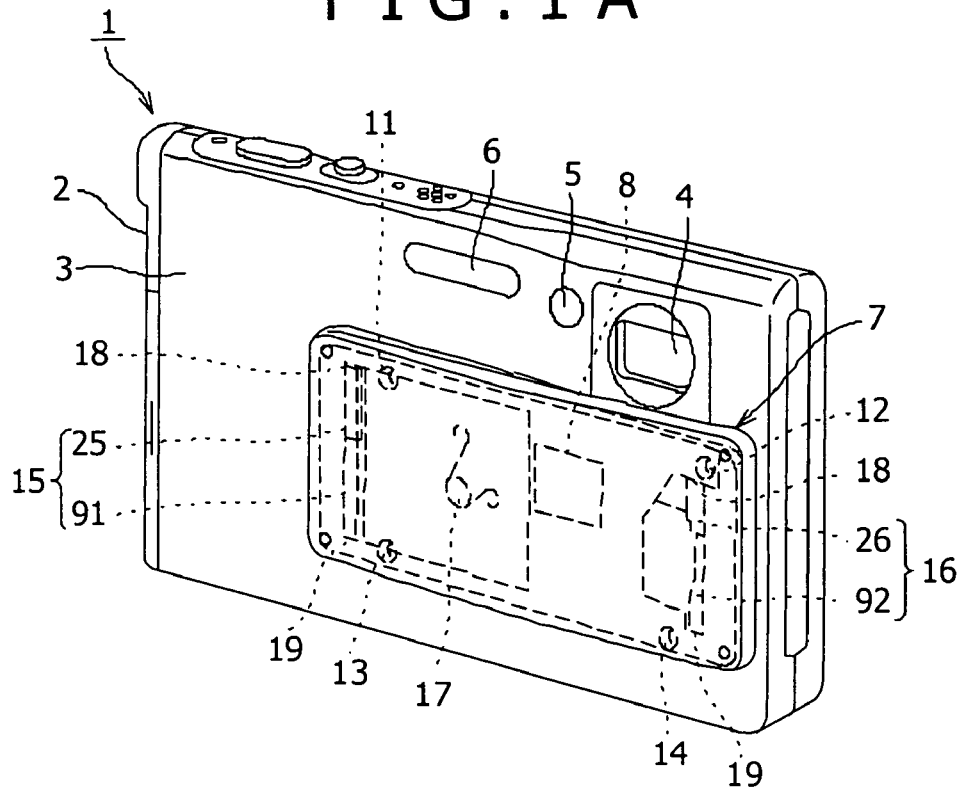
FIG. 1A is a perspective view of a digital camera as the imaging device of the present invention as viewed from the front side thereof, showing a first position (open position) of a barrier.
Figure 1B:
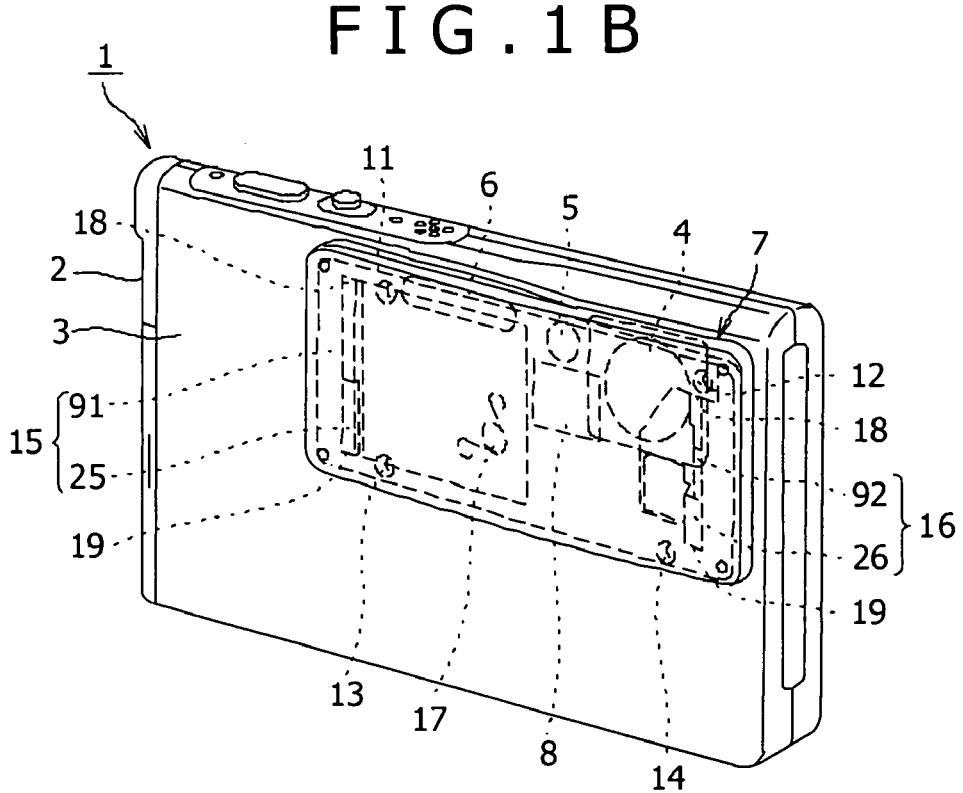
FIG. 1B is a view similar to FIG. 1A, showing a second position (closed position) of the barrier.
Figure 2A:
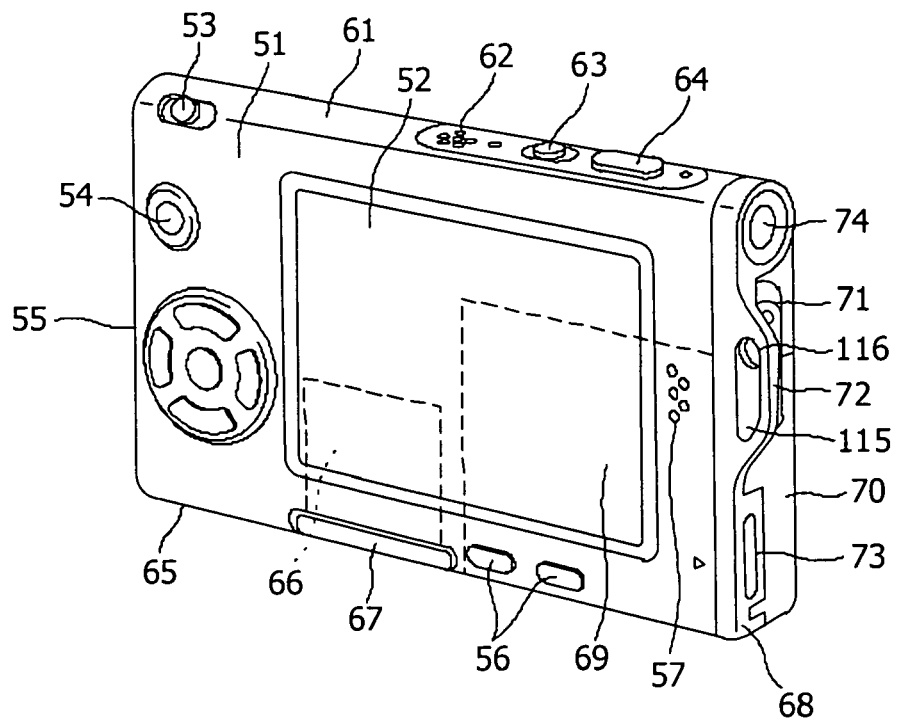
FIG. 2A is a perspective view of the digital camera as viewed from the rear side thereof.
Figure 2B:
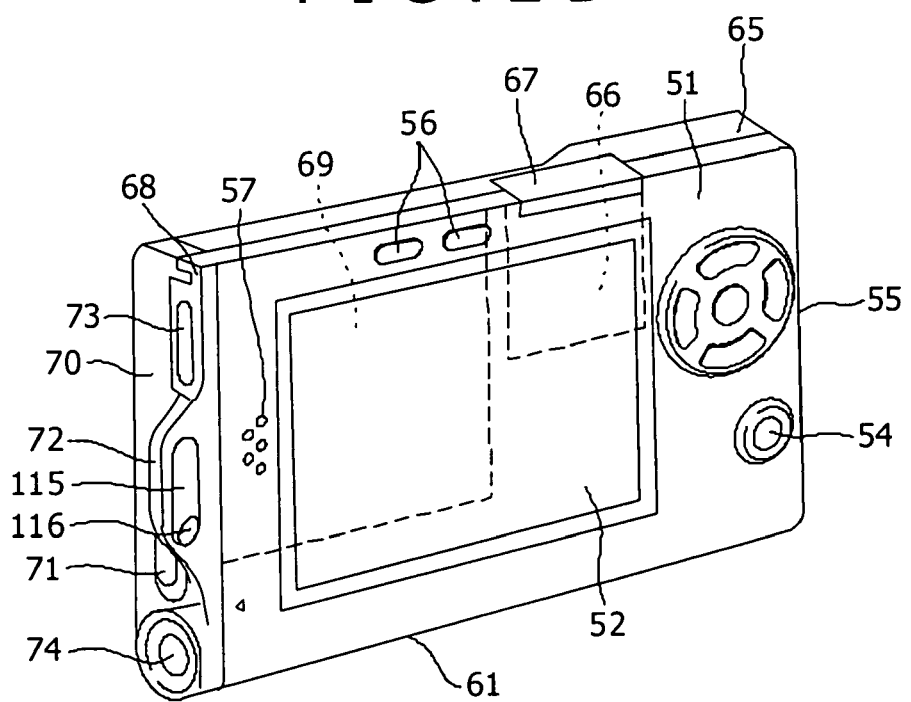
FIG. 2B is a view similar to FIG. 2A, showing the bottom side of the digital camera.

FIGS. 1A and 1B are perspective views of a digital camera 1 as the imaging device of the present invention as viewed from the front side thereof where a first main surface (front surface) 3 is oriented, and FIGS. 2A and 2B are perspective views of the digital camera 1 as viewed from the rear side thereof where a second main surface (rear surface) 51 is oriented.

The digital camera 1 includes a flat box-shaped housing 2 having the first main surface 3. An imaging lens 4, an AF illuminator 5 for emitting auxiliary light for autofocusing, and a flash light emitting portion 6 for flashing are exposed to the first main surface 3. A barrier (lens cover) 7 is mounted on the first main surface 3 so as to be movable between a first position where the imaging lens 4, the AF illuminator 5, and the flash light emitting portion 6 are exposed as shown in FIG. 1A and a second position where the imaging lens 4, the AF illuminator 5, and the flash light emitting portion 6 are covered by the barrier 7 as shown in FIG. 1B. An iris driving mechanism 8 accommodated in the housing 2 partially projects from the first main surface 3.

The iris driving mechanism 8 is positioned so as to be covered by the barrier 7 both in the first position shown in FIG. 1A and in the second position shown in FIG. 1B.

The barrier 7 is a substantially rectangular member, and it is provided with first to fourth rollers 11 to 14 at four corner portions and a pair of first and second barrier slide guides 15 and 16 at laterally opposite end portions along a direction of movement of the barrier 7. The first to fourth rollers 11 to 14 are in rolling contact with the first main surface 3 of the housing 2. Thus, the barrier 7 is movable on the first main surface 3 of the housing 2 between the first position and the second position by the first to fourth rollers 11 to 14 and the first and second barrier slide guides 15 and 16.

As described later in detail in the section of (2) configuration of Housing, the first barrier slide guide 15 is composed of a first barrier engaging member 25 provided on the housing 2 and a first rail 91 provided on the barrier. 7 and slidably engaged with the first barrier engaging member 25. Similarly, the second barrier slide guide 16 is composed of a second barrier engaging member 26 provided on the housing 2 and a second rail 92 provided on the barrier 7 and slidably engaged with the second barrier engaging member 26.

A pair of first stopper portions 18 are provided at the upper ends of the first and second rails 91 and 92, and a pair of second stopper portions 19 are provided at the lower ends of the first and second rails 91 and 92. In the first position of the barrier 7 shown in FIG. 1A, the first stopper portions 18 are pressed against the first and second barrier engaging members 25 and 26 by a spring force of a barrier biasing spring (which will be hereinafter referred to as toggle spring) 17, thereby maintaining the exposed condition of the imaging lens 4, the AF illuminator 5, and the flash light emitting portion 6. In the second position of the barrier 7 shown in FIG. 1B, the second stopper portions 19 are pressed against the first and second barrier engaging members 25 and 26 by the spring force of the toggle spring 17, thereby maintaining the covered condition of the imaging lens 4, the AF illuminator 5, and the flash light emitting portion 6.

As shown in FIG. 2A, the housing 2 has a first end surface (right end surface) 68 connecting the first main surface 3 and the second main surface 51. The first end surface 68 is provided with a battery lid 70 for openably closing an opening 69a of a battery compartment 69 defined in the housing 2 (see FIGS. 8 and 9), a battery release lever 71 for allowing the insertion of a battery into the battery compartment 69 and the ejection of the battery from the battery compartment 69, a strap hook 72 on which the battery lid 70 is laid in its open condition, a multiconnector connection terminal 73, and a power button 74. The battery release lever 71 is located adjacent to the battery lid 70 so as not to be substantially covered with the battery lid 70 in its closed condition.

(2) Configuration of Housing

Figure 3:
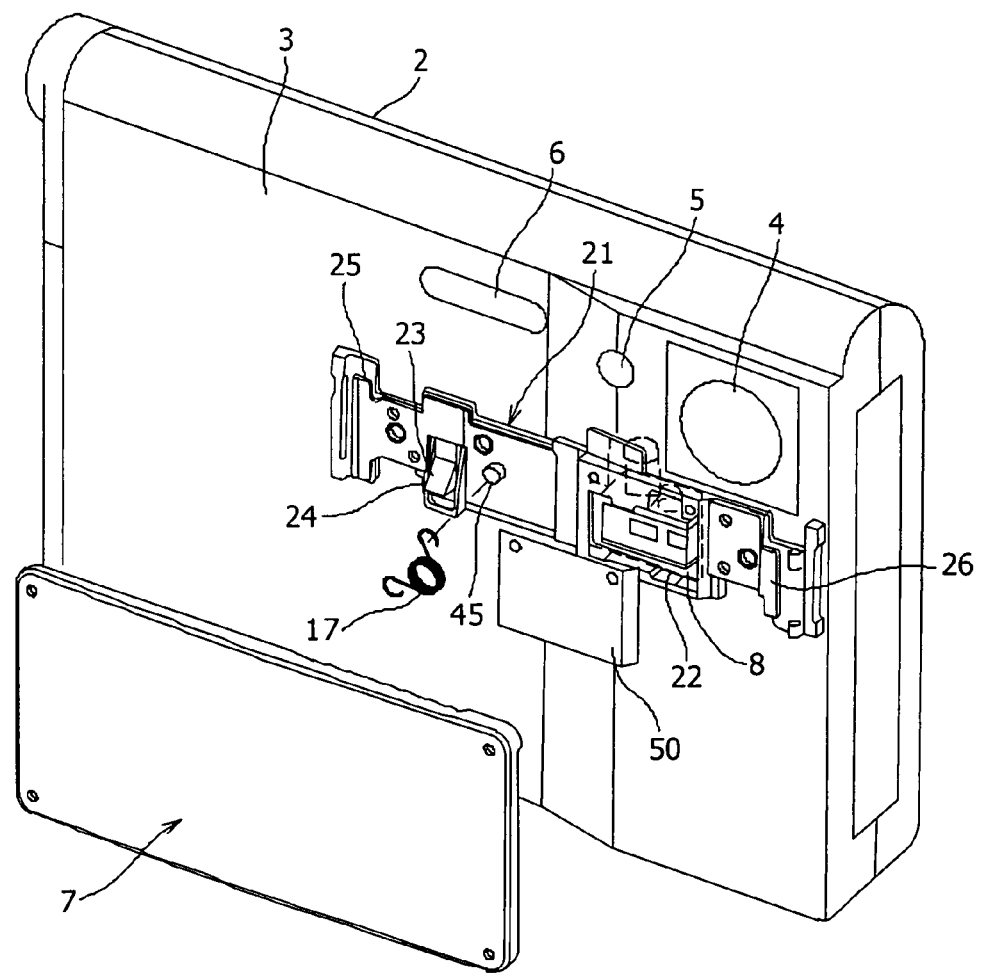
FIG. 3 is a perspective view of the digital camera in the condition where the barrier is removed.

FIG. 3 shows a condition where the barrier 7 is removed. As shown in FIG. 3, the imaging lens 4 is located at an upper left corner of the first main surface 3 of the housing 2, and the AF illuminator 5 and the flash light emitting portion 6 are located on the right side of the imaging lens 4.

A base plate 21 is mounted on the first main surface 3 at a position below the imaging lens 4, the AF illuminator 5, and the flash light emitting portion 6. The base plate 21 is formed with a first opening 22, in which a part of the iris driving mechanism 8 is accommodated. The base plate 21 is further formed with a second opening 23, in which a switch operating member 24 is located. The switch operating member 24 functions to operate a barrier position detecting switch (not shown) provided in the housing 2 for detecting whether the barrier 7 is in the first position or in the second position. The first and second barrier engaging members 25 and 26 respectively constituting the first and second barrier slide guides 15 and 16 are provided on the base plate 21 at its opposite end portions.

Figure 4:
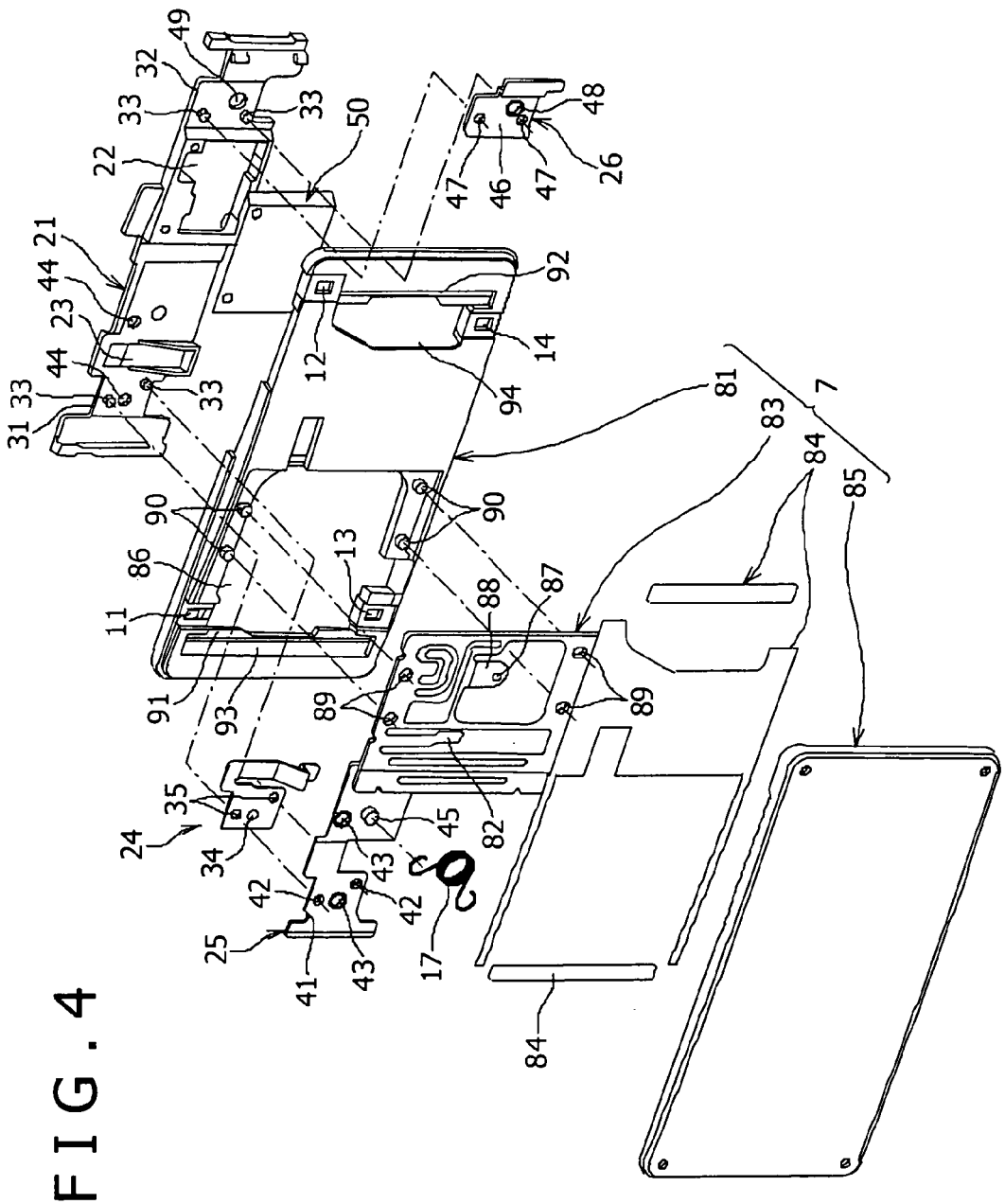
FIG. 4 is an exploded perspective view of the barrier.

As shown in FIG. 4, the base plate 21 has a first mounting portion 31 for mounting the first barrier engaging member 25 and a second mounting portion 32 for mounting the second barrier engaging member 26. The first mounting portion 31 is located on the right side of the second opening 23, and the second mounting portion 32 is located on the left side of the first opening 22. Each of the first and second mounting portions 31 and 32 is formed with a plurality of bosses 33.

The switch operating member 24 is formed by bending a leaf spring into a substantially V-shaped configuration. The switch operating member 24 has a mounting portion 34 adapted to be mounted on the base plate 21. The mounting portion 34 is formed with a plurality of boss insert holes 35 for insertion of the bosses 33 formed on the first mounting portion 31 of the base plate 21.

The switch operating member 24 is inserted into the second opening 23 and mounted on the first mounting portion 31 by inserting the bosses 33 of the first mounting portion 31 through the boss insert holes 35 of the mounting portion 34.

The first barrier engaging member 25 is formed by bending a metal plate. The first barrier engaging member 25 has a mounting portion 41 adapted to be mounted on the base plate 21. The mounting portion 41 is formed with a plurality of boss insert holes 42 for insertion of the bosses 33 formed on the first mounting portion 31 of the base plate 21.

In mounting the first barrier engaging member 25 to the base plate 21, the bosses 33 of the first mounting portion 31 of the base plate 21 are first inserted through the boss insert holes 35 of the mounting portion 34 of the switch operating member 24, and next inserted through the boss insert holes 42 of the mounting portion 41 of the first barrier engaging member 25. Thereafter, the head of each boss 33 is deformed by caulking to increase the diameter, thereby fixedly mounting the first barrier engaging member 25 to the first mounting portion 31 of the base plate 21 with the mounting portion 34 of the switch operating member 24 sandwiched therebetween. The mounting portion 41 of the first barrier engaging member 25 is further formed with a plurality of positioning bosses 43.

The base plate 21 is further formed with a plurality of boss insert holes 44 for insertion of the positioning bosses 43 of the first barrier engaging member 25. Accordingly, in the mounted condition of the first barrier engaging member 25 on the first mounting portion 31 of the base plate 21, the first barrier engaging member 25 is positioned by the insertion of the positioning bosses 43 into the boss insert holes 44. The mounting portion 41 of the first barrier engaging member 25 is further formed with a first spring hook 45 for holding one end of the toggle spring 17.

As similar to the first barrier engaging member 25, the second barrier engaging member 26 is formed by bending a metal plate. The second barrier engaging member 26 has a mounting portion 46 adapted to be mounted on the base plate 21. The mounting portion 46 is formed with a plurality of boss insert holes 47 for insertion of the bosses 33 formed on the second mounting portion 32 of the base plate 21.

In mounting the second barrier engaging member 26 to the base plate 21, the bosses 33 of the second mounting portion 32 of the base plate 21 are inserted through the boss insert holes 47 of the mounting portion 46 of the second barrier engaging member 26. Thereafter, the head of each boss 33 is deformed by caulking to increase the diameter, thereby fixedly mounting the second barrier engaging member 26 to the second mounting portion 32 of the base plate 21. The mounting portion 46 of the second barrier engaging member 26 is further formed with a positioning boss 48. On the other hand, the second mounting portion 32 of the base plate 21 is further formed with a boss insert hole 49 for insertion of the positioning boss 48 of the second barrier engaging member 26. Accordingly, in the mounted condition of the second barrier engaging member 26 on the second mounting portion 32 of the base plate 21, the second barrier engaging member 26 is positioned by the insertion of the positioning boss 48 into the boss insert hole 49. The first opening 22 of the base plate 21 is covered with an iris cover sheet 50 for preventing the entry of dust or the like from the first opening 22 into the housing 2.

As shown in FIG. 2A, the second main surface 51 opposite to the first main surface 3 of the housing 2 is provided with a display 52 such as a liquid crystal display, a mode selector switch 53, a menu button 54, a control button 55, screen display on/off buttons 56, and a speaker 57. Further, the housing 2 has a second end surface (upper end surface) 61 connecting the first main surface 3 and the second main surface 51. The second end surface 61 is provided with a microphone 62, a zoom button 63, and a shutter button 64.

(3) Configuration of Barrier

As shown in FIG. 4, the barrier 7 is composed of an inner member 81 like a rectangular frame, a metal plate 83 mounted on the inner member 81 and provided with a switch depressing portion 82 for depressing the switch operating member 24, and an outer member 85 mounted through a plurality of double-sided adhesive sheets 84 to the outer (front) surface of the inner member 81 on which the metal plate 83 is mounted.

The inner member 81 is formed with a substantially rectangular opening 86, and the metal plate 83 is mounted on the inner member 81 so as to be exposed to the opening 86. The switch depressing portion 82 of the metal plate 83 is formed by cutting and bending. The metal plate 83 is further formed with a tongue portion 88 having a second spring hook 87 for holding the other end of the toggle spring 17 whose one end is held by the first spring hook 45 of the first barrier engaging member 25. The tongue portion 88 of the metal plate 83 is also formed by cutting and bending.

The metal plate 83 is formed at its peripheral portion with a plurality of boss insert holes 89. On the other hand, the inner member 81 is formed with a plurality of bosses 90 at a peripheral portion near the opening 86. In mounting the metal plate 83 to the inner member 81, the bosses 90 of the inner member 81 are inserted through the boss insert holes 89 of the metal plate 83, and the head of each boss 90 is deformed by caulking to increase the diameter, thereby fixedly mounting the metal plate 83 on the outer surface of the inner member 81.

The first to fourth rollers 11 to 14 adapted to contact with the first main surface 3 of the housing 2 are located at the substantially four corner portions of the inner member 81, and the first and second rails 91 and 92 adapted to respectively slidably engage with the first and second barrier engaging members 25 and 26 mounted on the base plate 21 are formed at the laterally opposite end portions of the inner member 81 along the moving direction thereof.

The first rail 91 is formed along a first elongated hole 93 formed at the right end portion of the inner member 81, and the second rail 92 is formed along a second elongated hole 94 formed at the left end portion of the inner member 81. The first and second barrier engaging members 25 and 26 and the first and second rails 91 and 92 constitute the first and second barrier slide guides 15 and 16, respectively.

(4) Configuration of Rollers

Figure 5:
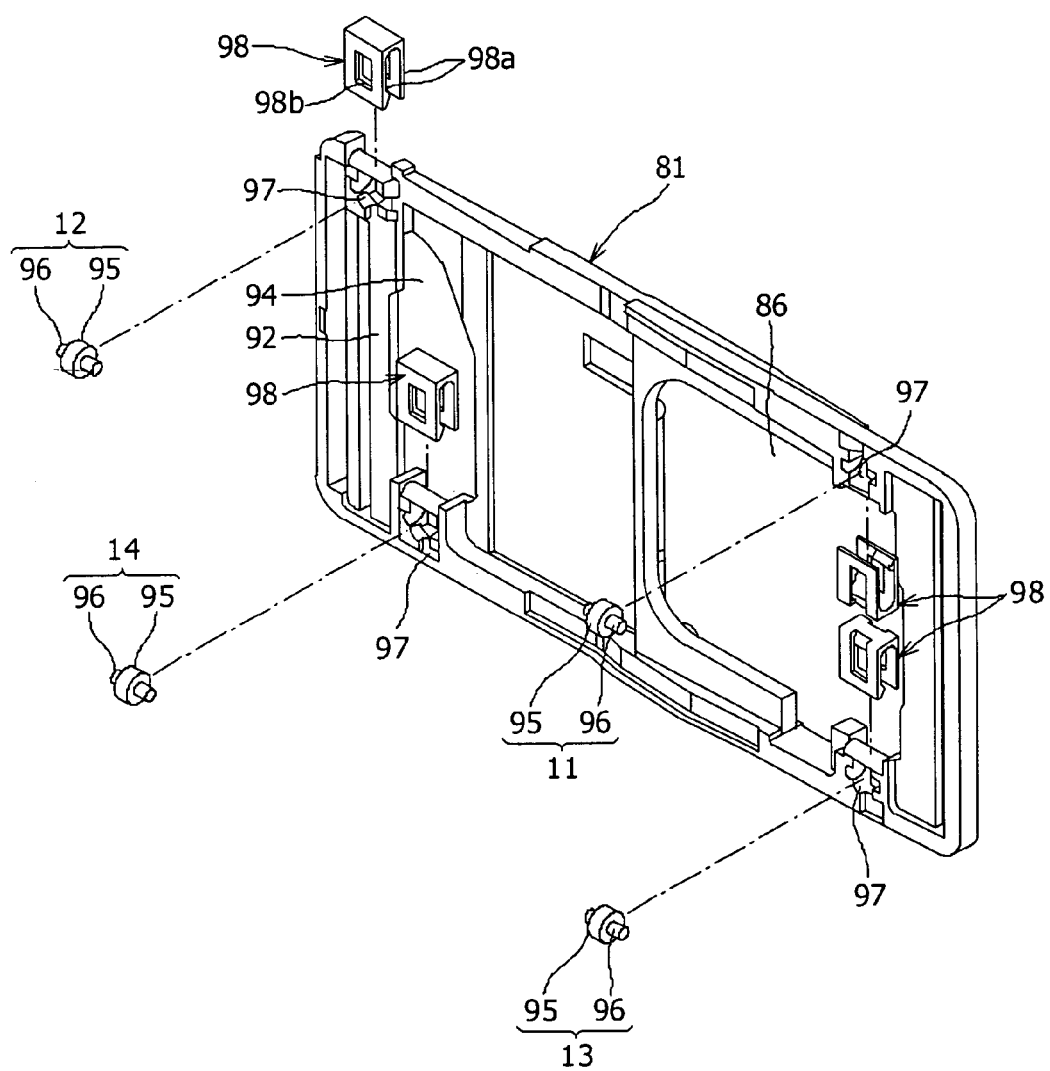
FIG. 5 is a perspective view showing the mounting of rollers in the barrier.

As shown in FIG. 5, each of the first to fourth rollers 11 to 14 is composed of a disk-shaped roller body 95 and a rotating shaft 96 projecting from the opposite side surfaces of the roller body 95. The first to fourth rollers 11 to 14 are respectively accommodated in first to fourth roller accommodating portions 97 formed at the four corner portions of the inner member 81 in such a manner that the rotating shafts 96 of the rollers 11 to 14 are rotatably supported to the respective roller accommodating portions 97.

Four substantially U-shaped clips 98 are respectively fitted with the four roller accommodating portions 97 in which the rollers 11 to 14 are rotatably accommodated, thereby preventing the drop of the rollers 11 to 14 from the roller accommodating portions 97. Each clip 98 has a pair of opposed plate portions 98a each formed with a window 98b, and a part of the disk-shaped roller body 95 of each roller projects from the windows 98a of each clip 98.

In the condition where the inner member 81 is laid on the first main surface 3 of the housing 2, the rollers 11 to 14 are adapted to contact with the first main surface 3 of the housing 2.

(5) Configuration of Barrier Slide Guides

Figure 6A:
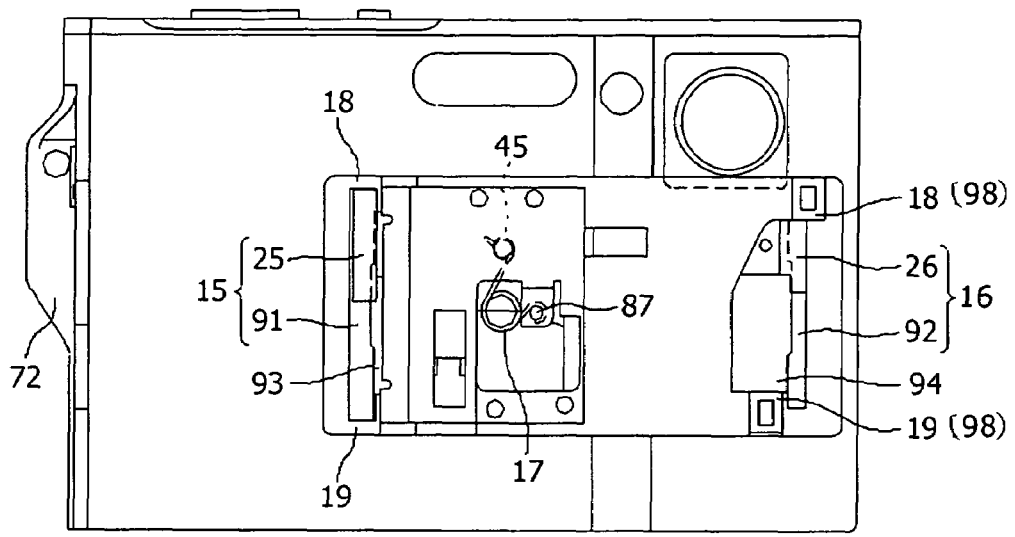
FIGS. 6A and 6B are elevational views of the digital camera, showing the operation of a toggle spring.
Figure 6B:
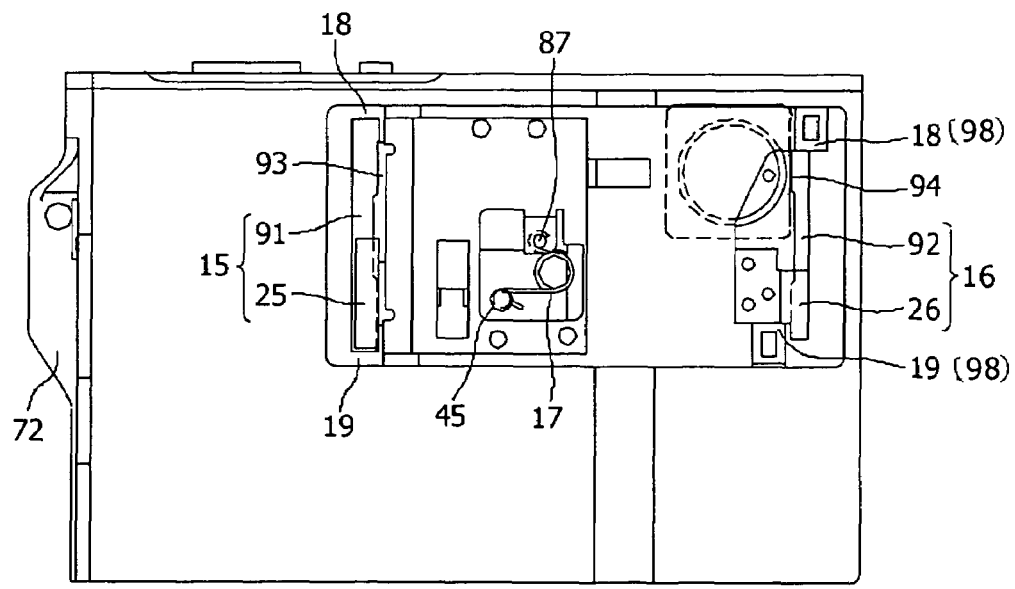

The first and second barrier slide guides 15 and 16 function to guide the movement of the barrier 7. As shown in FIGS. 6A and 6B, the first barrier slide guide 15 is located at the right end portion of the barrier 7, and the second barrier slide guide 16 is located at the left end portion of the barrier 7.

The first barrier slide guide 15 is configured by slidably engaging the first barrier engaging member 25 fixed to the housing 2 with the first rail 91 of the inner member 81 of the barrier 7. Similarly, the second barrier slide guide 16 is configured by slidably engaging the second barrier engaging member 26 fixed to the housing 2 with the second rail 92 of the inner member 81 of the barrier 7.

The first rail 91 is engaged with the first barrier engaging member 25 in such a manner that the first barrier engaging member 25 is inserted through the first elongated hole 93 of the inner member 81 and is laid on the first rail 91, thereby lightly pressing the rollers 11 to 14 against the first main surface 3 of the housing 2. Similarly, the second rail 92 is engaged with the second barrier engaging member 26 in such a manner that the second barrier engaging member 26 is inserted through the second elongated hole 94 of the inner member 81 and is laid on the second rail 92, thereby lightly pressing the rollers 11 to 14 against the first main surface 3 of the housing 2. The barrier 7 is adapted to be moved along the first and second elongated holes 93 and 94 between the first position where the imaging lens 4 is exposed and the second position where the imaging lens 4 is covered.

As shown in FIG. 6A, the first stopper portions 18 are formed at the upper ends of the first and second rails 91 and 92, so that when the barrier 7 is moved to the first position, the first stoppers 18 come into abutment against the first and second barrier engaging members 25 and 26 to thereby prevent further downward movement of the barrier 7. On the other hand, as shown in FIG. 6B, the second stoppers 19 are formed at the lower ends of the first and second rails 91 and 92, so that when the barrier 7 is moved to the second position, the second stoppers 19 come into abutment against the first and second barrier engaging members 25 and 26 to thereby prevent further upward movement of the barrier 7. In particular, the first and second stoppers 18 and 19 at the opposite ends of the second rail 92 are formed by the clips 98 for preventing the drop of the second and fourth rollers 12 and 14 from the second and fourth roller accommodating portions 97.

(6) Configuration of Toggle Spring

The toggle spring 17 functions to maintain the first position (open condition) of the barrier 7 by making the abutment of the first stoppers 18 against the first and second barrier engaging members 25 and 26 or to maintain the second position (closed condition) of the barrier 7 by making the abutment of the second stoppers 19 against the first and second barrier engaging members 25 and 26.

Figure 7:
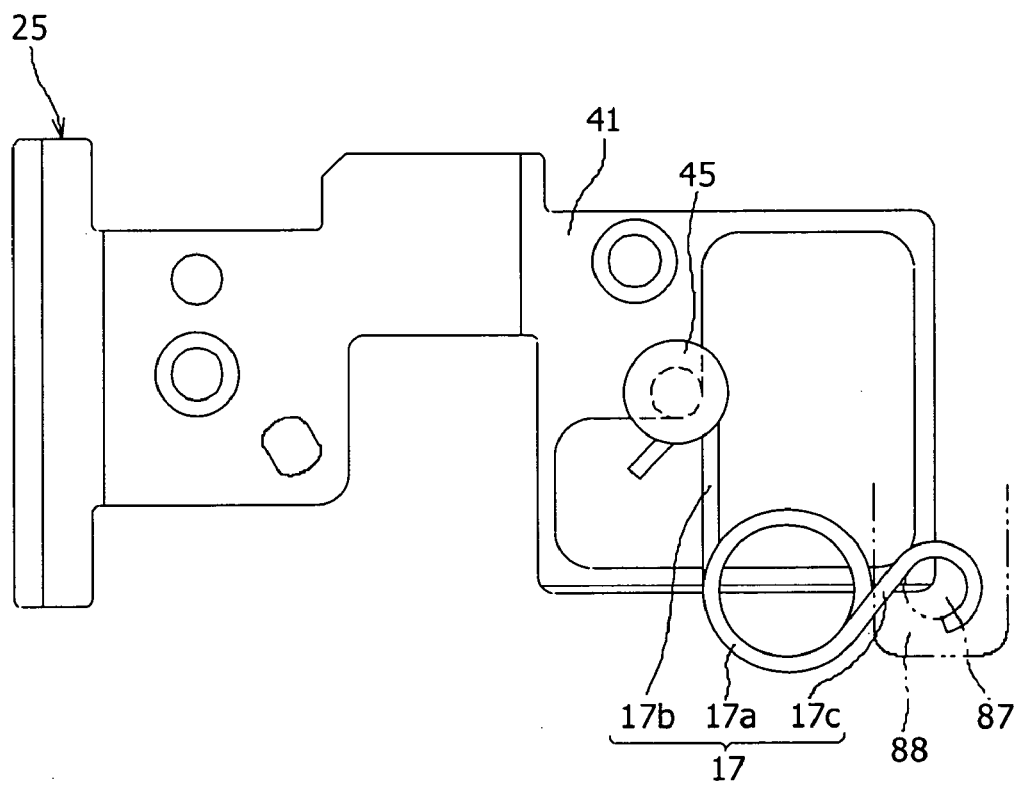
FIG. 7 is an enlarged view of the toggle spring.

As shown in FIG. 7, the toggle spring 17 is provided by a torsion coil spring composed of a coil portion 17a, a first arm portion 17b extending from one end of the coil spring 17a, and a second arm portion 17c extending from the other end of the coil spring 17a.

The first arm portion 17b of the toggle spring 17 is rotatably engaged with the first spring hook 45 formed on the mounting portion 41 of the first barrier engaging member 25. The second arm portion 17c of the toggle spring 17 is rotatably engaged with the second spring hook 87 formed on the tongue portion 88 of the metal plate 83 (see FIG. 4) mounted on the inner member 81 of the barrier 7.

In the first position of the barrier 7 shown in FIG. 6A, the toggle spring 17 downward biases the barrier 7 to make the abutment of the first stoppers 18 against the first and second barrier engaging members 25 and 26, thereby maintaining the barrier 7 in its open condition. When the barrier 7 is moved from the first position toward the second position, the coil portion 17a of the toggle spring 17 is rotated (inverted) about the first spring hook 45. When the barrier 7 comes to a given position, the direction of the biasing force of the toggle spring 17 is reversed to make the abutment of the second stoppers 19 against the first and second barrier engaging members 25 and 26 as shown in FIG. 6B, thereby maintaining the barrier 7 in its closed condition.

(7) Configuration of Battery Lid

Figure 8:
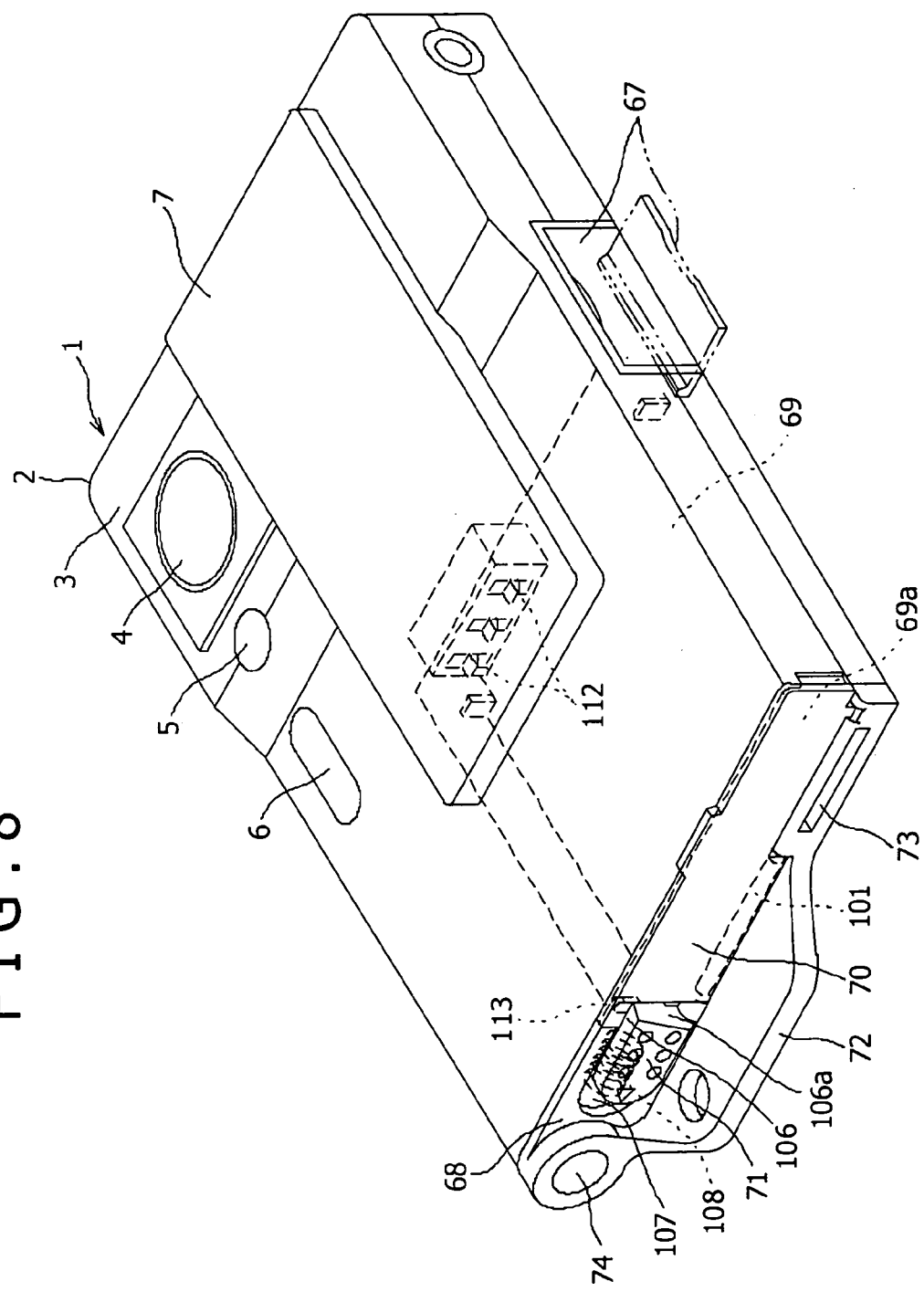
FIG. 8 is a perspective view of the digital camera, showing a closed condition of a battery lid.

As shown in FIG. 8, the end surface 68 connecting the first main surface 3 and the second main surface 51 is provided with the battery lid 70 for openably closing the opening 69a of the battery compartment 69 defined between the first main surface 3 and the second main surface 51, the battery release lever 71 for allowing the insertion of a battery into the battery compartment 69 and the ejection of the battery from the battery compartment 69, the strap hook 72 on which the battery lid 70 is laid in its open condition, and the multiconnector connection terminal 73. The battery release lever 71 is located adjacent to one longitudinal end of the battery lid 70.

Figure 9:
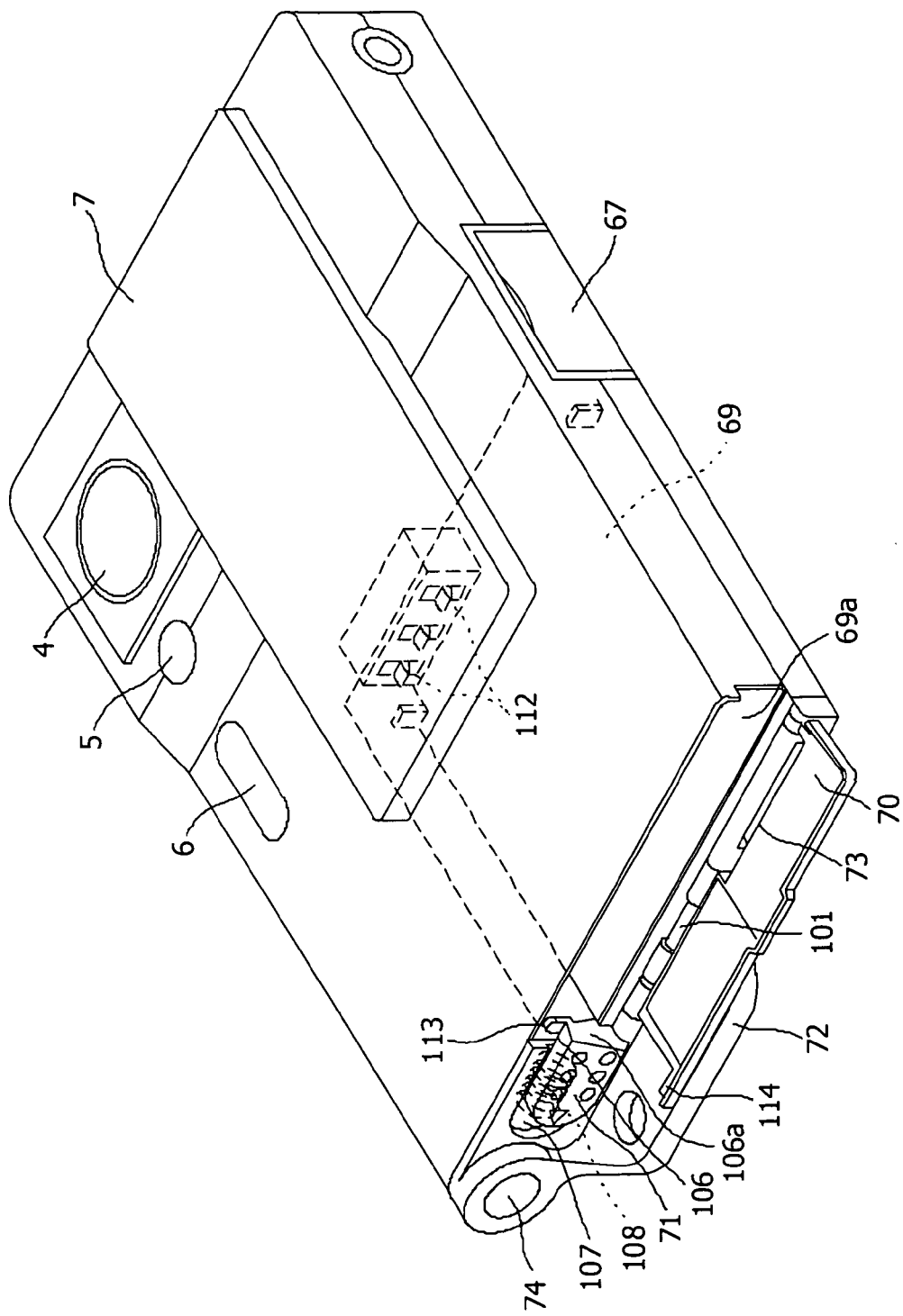
FIG. 9 is a view similar to FIG. 8, showing an open condition of the battery lid.

The battery lid 70 is pivotably mounted through a shaft 101 to the housing 2. When the battery lid 70 in its open condition is rotated clockwise about the shaft 101 as viewed from the lower side of the housing 2, the battery lid 70 is laid on the end surface 68 of the housing 2 to close the opening 69a as shown in FIG. 8. When the battery lid 70 is rotated counterclockwise about 1000 from the closed condition shown in FIG. 8 as viewed from the lower side of the housing 2, the battery lid 70 is opened to be laid on the strap hook 72 as shown in FIG. 9, so that further rotation of the battery lid 70 is limited for protection by the strap hook 72.

Figure 10:
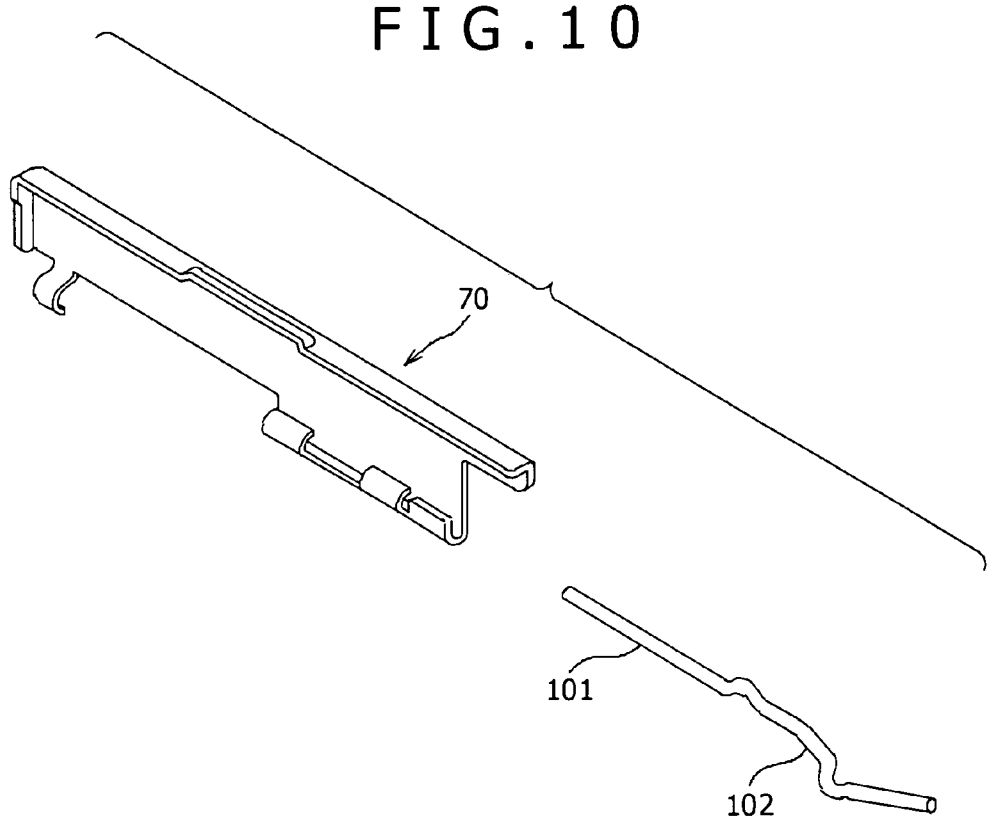
FIG. 10 is an exploded perspective view of the battery lid and a shaft for mounting it.
Figure 11:
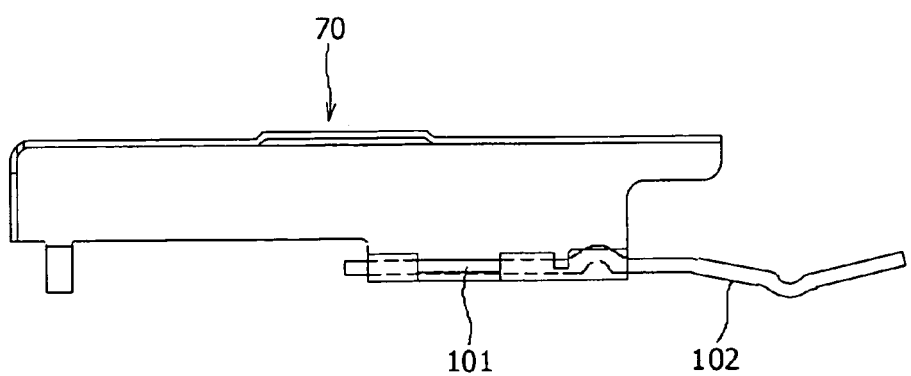
FIG. 11 is an elevational view showing the assembly of the battery lid and the shaft shown in FIG. 10.
Figure 12A:
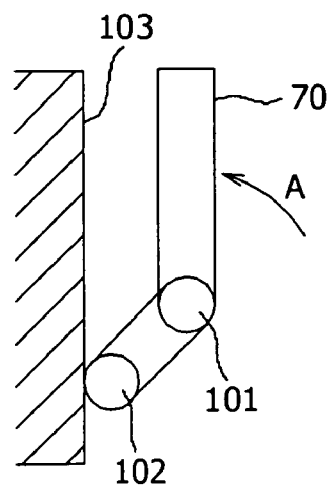
FIGS. 12A to 12C are schematic views for illustrating the operation of a spring portion formed at one end portion of the shaft.
Figure 12B:
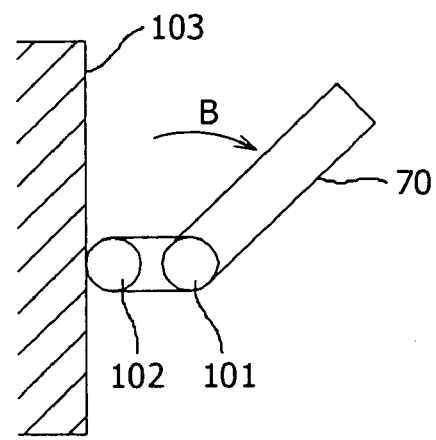
Figure 12C:
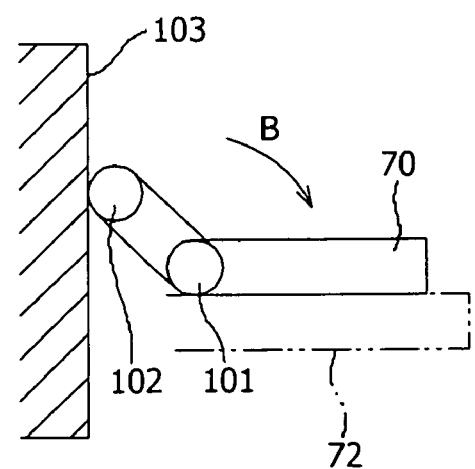

As shown in FIG. 10, the shaft 101 is provided by a metal bar having elasticity. One end portion of the shaft 101 is formed as a spring portion 102 for biasing the battery lid 70 against the end surface 68 of the housing 2 in the closed condition of the battery lid 70 and for biasing the battery lid 70 against the strap hook 72 in the open condition of the battery lid 70. The spring portion 102 is formed by bending one end portion of the shaft 101. As shown in FIGS. 12A to 12C, the spring portion 102 of the shaft 101 is kept in contact with a spring contact surface 103 of the housing 2.

In the closed condition of the battery lid 70 as shown in FIG. 12A, the spring portion 102 kept in contact with the spring contact surface 103 of the housing 2 imparts a rotational force in a direction of arrow A to the shaft 101 and the battery lid 70, thereby pressing the battery lid 70 against the end surface 68 of the housing 2. When the battery lid 70 is rotated from the closed condition shown in FIG. 12A in its opening direction (direction show by arrow B in FIG. 12B), the spring portion 102 is elastically deformed by the reaction from the spring contact surface 103. FIG. 12B shows a condition where the battery lid 70 is opened by a predetermined angle, e.g., 45° and the spring portion 102 is most deformed to reach a neutral position where no rotational force is applied to the shaft 101 and the battery lid 70. When the battery lid 70 is further rotated in the opening direction of the arrow B from the condition shown in FIG. 12B, the spring portion 102 imparts a rotational force in the direction of the arrow B to the shaft 101 and the battery lid 70, thereby pressing the battery lid 70 against the strap hook 72 to maintain the open condition of the opening 69a of the housing 2.

(8) Configuration of Battery Release Lever

As shown in FIGS. 8 and 9, the battery release lever 71 is formed at its one end portion with a battery engaging portion 106. The battery release lever 71 is slidably mounted on a lever guide portion 107 formed on the first end surface 68 of the housing 2 so as to be movable between an advanced position where the battery engaging portion 106 of the battery release lever 71 is advanced to close a part of the opening 69a of the battery compartment 69 and a retracted position where the battery engaging portion 106 is retracted to open this part of the opening 69a. A spring 108 is provided in the housing 2 at a position under the battery release lever 71, so as to normally bias the battery release lever 71 toward the above advanced position. The battery engaging portion 106 has a wedged front end 106a functioning as a battery displacing surface for displacing the battery accommodated in the battery compartment 69.

Figure 13:
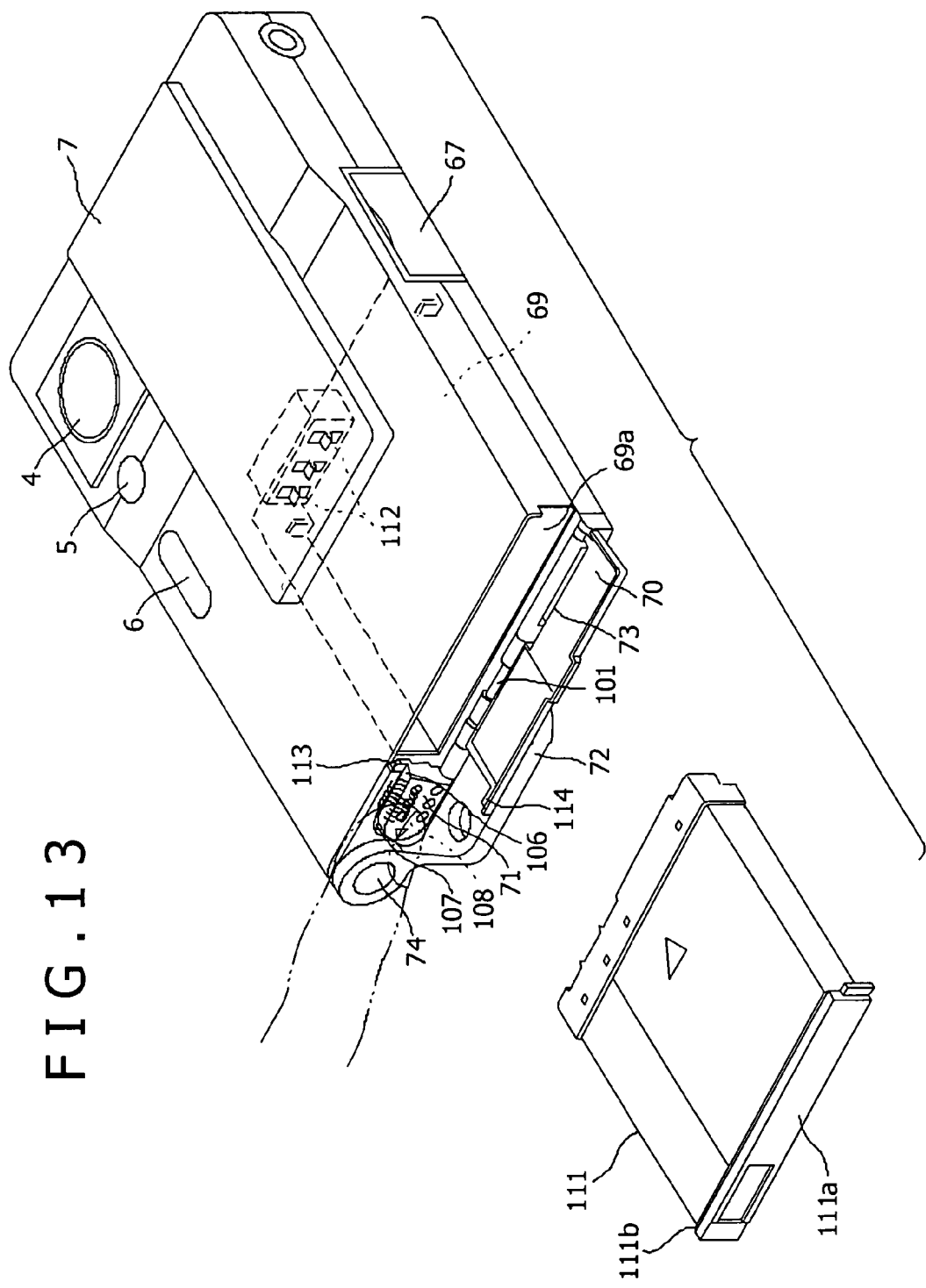
FIG. 13 is a perspective view of the digital camera, showing a condition where the battery lid is opened and a battery release lever is retracted to insert a battery into a battery compartment.
Figure 14:
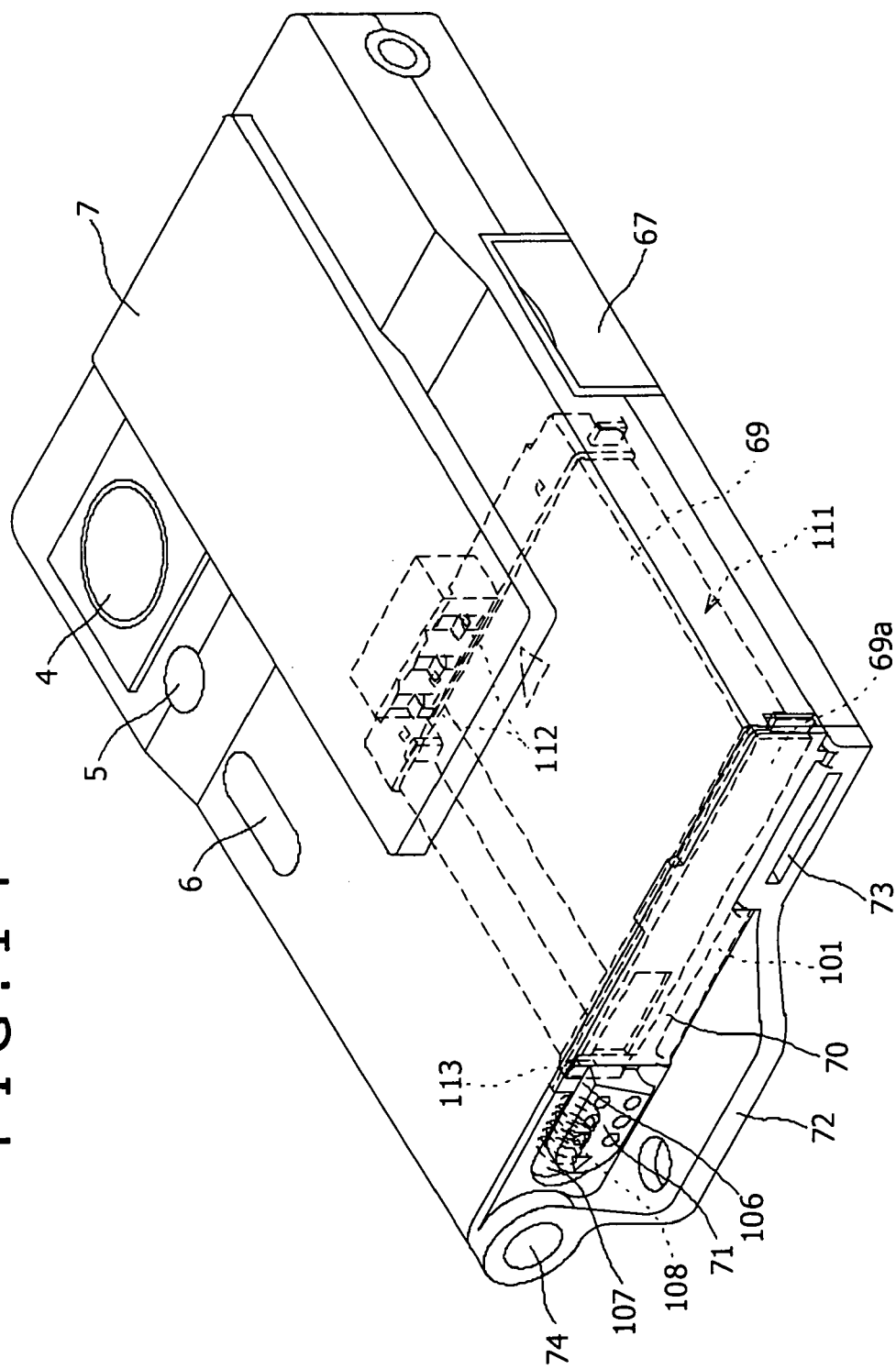
FIG. 14 is a view similar to FIG. 13, showing a condition where the battery is inserted into the battery compartment and the battery lid is closed with the battery release lever returned to its original position.

FIG. 13 shows an operation of inserting a battery 111 into the battery compartment 69. In this operation, the battery lid 70 is first opened to the position where it abuts against the strap hook 72, and the battery release lever 71 is next retracted to the position where it does not interfere with the battery 111 to be inserted through the opening 69a, against a biasing force of the spring 108 by an operator's finger, for example. As maintaining this retracted position of the battery release lever 71, the battery 111 is inserted into the battery compartment 69.

After the battery 111 is inserted into the battery compartment 69, the force of retracting the battery release lever 71 is removed from the battery release lever 71. As a result, the battery release lever 71 is automatically returned to the advanced position by the biasing force of the spring 108, thereby preventing unintentional ejection of the battery 111 from the battery compartment 69. Thereafter, the battery lid 70 is closed to finish the insert operation of the battery 111.

If the battery release lever 71 can be retracted in the closed condition of the battery lid 70, there is a possibility that when the battery release lever 71 is erroneously retracted, the battery 111 may be unintentionally ejected from the battery compartment 69 by a spring force of battery contact terminals 112 provided at the innermost end of the battery compartment 69. If the amount of such unintentional ejection of the battery 111 is slight, it may not become apparent that the battery 111 is not fully inserted in the battery compartment 69.

Figure 15:
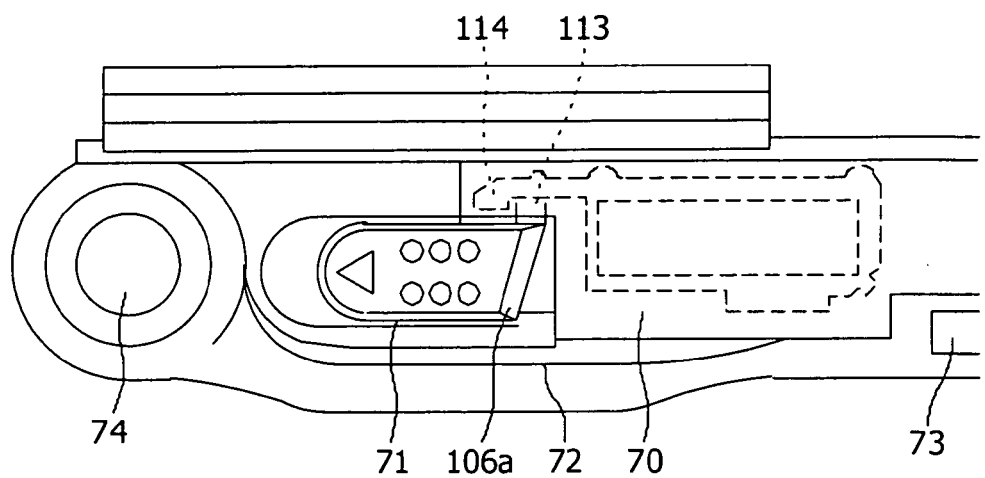
FIG. 15 is an enlarged side view of an essential part of the digital camera, showing the closed condition of the battery lid where the battery release lever is engaged with the battery lid to prevent unintentional slide of the battery release lever.

To cope with this problem, the battery release lever 71 is formed with a battery lid engaging portion 113, and the battery lid 70 is formed with a release lever engaging portion 114 as shown in FIG. 13. In the closed condition of the battery lid 70, the release lever engaging portion 114 is located adjacent to the battery lid engaging portion 113 as shown in FIG. 15. With this configuration, the battery lid engaging portion 113 of the battery release lever 71 is engaged with the release lever engaging portion 114 of the battery lid 70 to thereby prevent the retraction of the battery release lever 71 in the closed condition of the battery lid 70.

Figure 16:
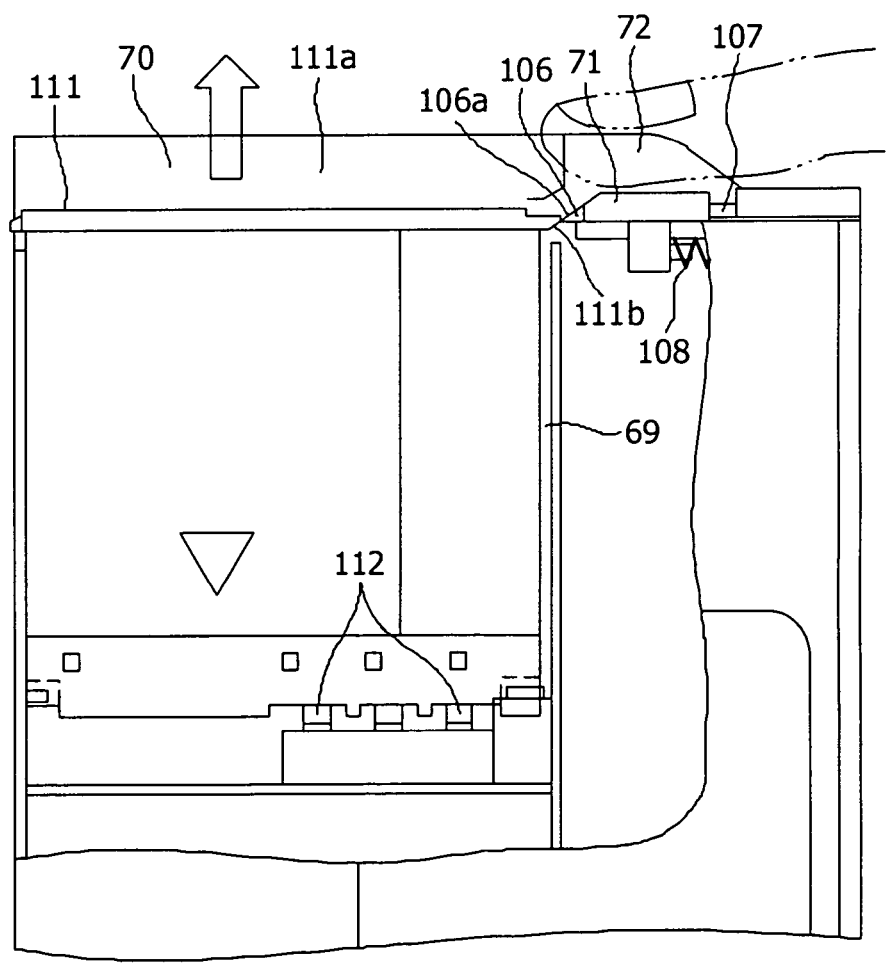
FIG. 16 is a partially cutaway, plan view of an essential part of the digital camera, showing a condition where the battery is slightly ejected from the battery compartment by springy terminals provided in the battery compartment.

In ejecting the battery 111 from the battery compartment 69, the battery lid 70 is first opened and the battery release lever 71 is next retracted against the biasing force of the spring 108. At this time, the battery 111 is slightly ejected from the battery compartment 69 by the spring force of the battery contact terminals 112 as shown in FIG. 16.

Figure 17:
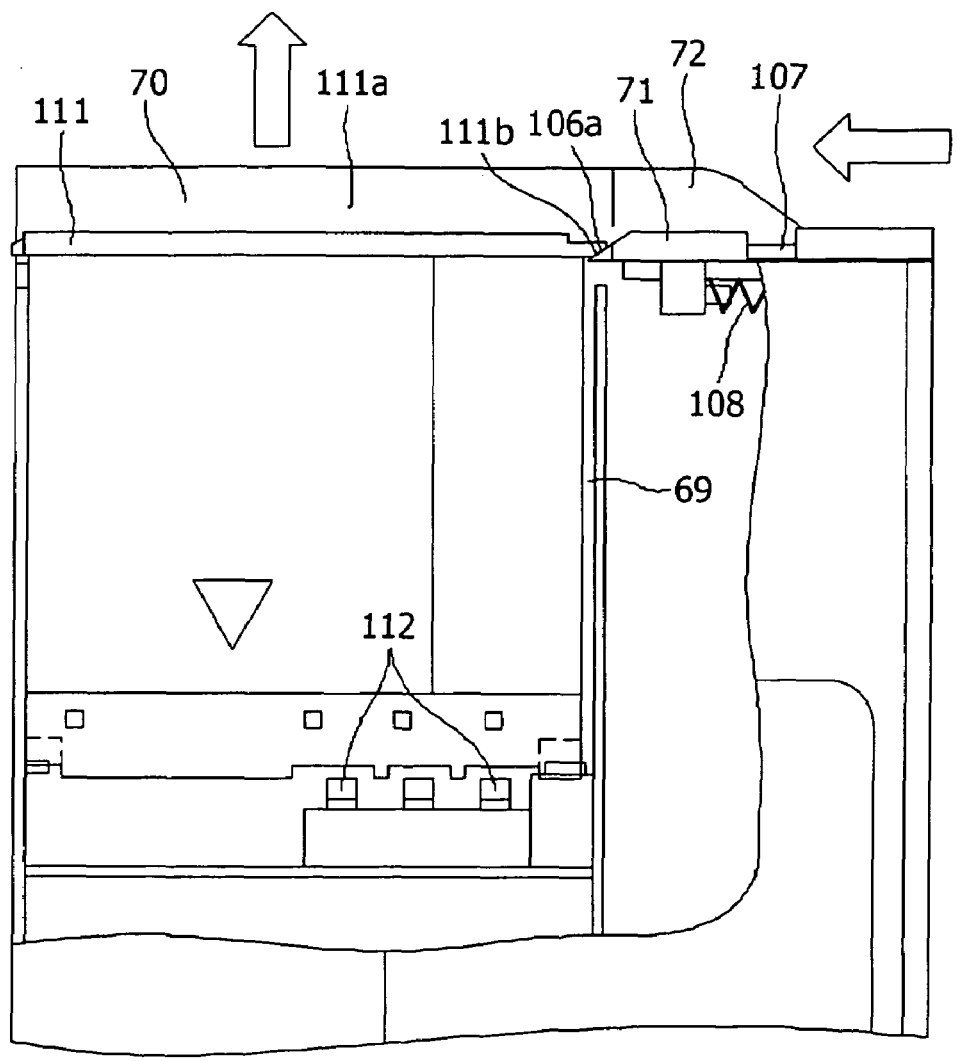
FIG. 17 is a view similar to FIG. 16, showing a condition where the battery is further ejected by moving the battery release lever.

After the battery 111 is slightly ejected from the battery compartment 69 as mentioned above, the battery release lever 71 is moved toward the advanced position to further eject the battery 111 from the battery compartment 69. More specifically, as shown in FIG. 17, the wedged front end 106a of the battery engaging portion 106 of the battery release lever 71 comes into sliding engagement with a wedged portion 111b formed at one end of a frame 111a of the battery 111, thereby further ejecting the battery 111 from the battery compartment 69. In this preferred embodiment, the amount of ejection of the battery 111 by the battery contact terminals 112 and the battery release lever 71 is small. However, in the case of desiring a large amount of ejection of the battery 111 from the battery compartment 69, a push spring (not shown) for pushing the battery 111 to increase the amount of ejection of the battery 111 may be provided at the innermost end of the battery compartment 69.

(9) Configuration of Strap Hook

The strap hook 72 serves to catch a wrist strap or neck strap adapted to an operator's wrist or neck for the purpose of prevention of drop. The strap hook 72 serves also to facilitate the holding of the housing 2 by an operator's thumb, for example, in taking a picture.

Figure 18:
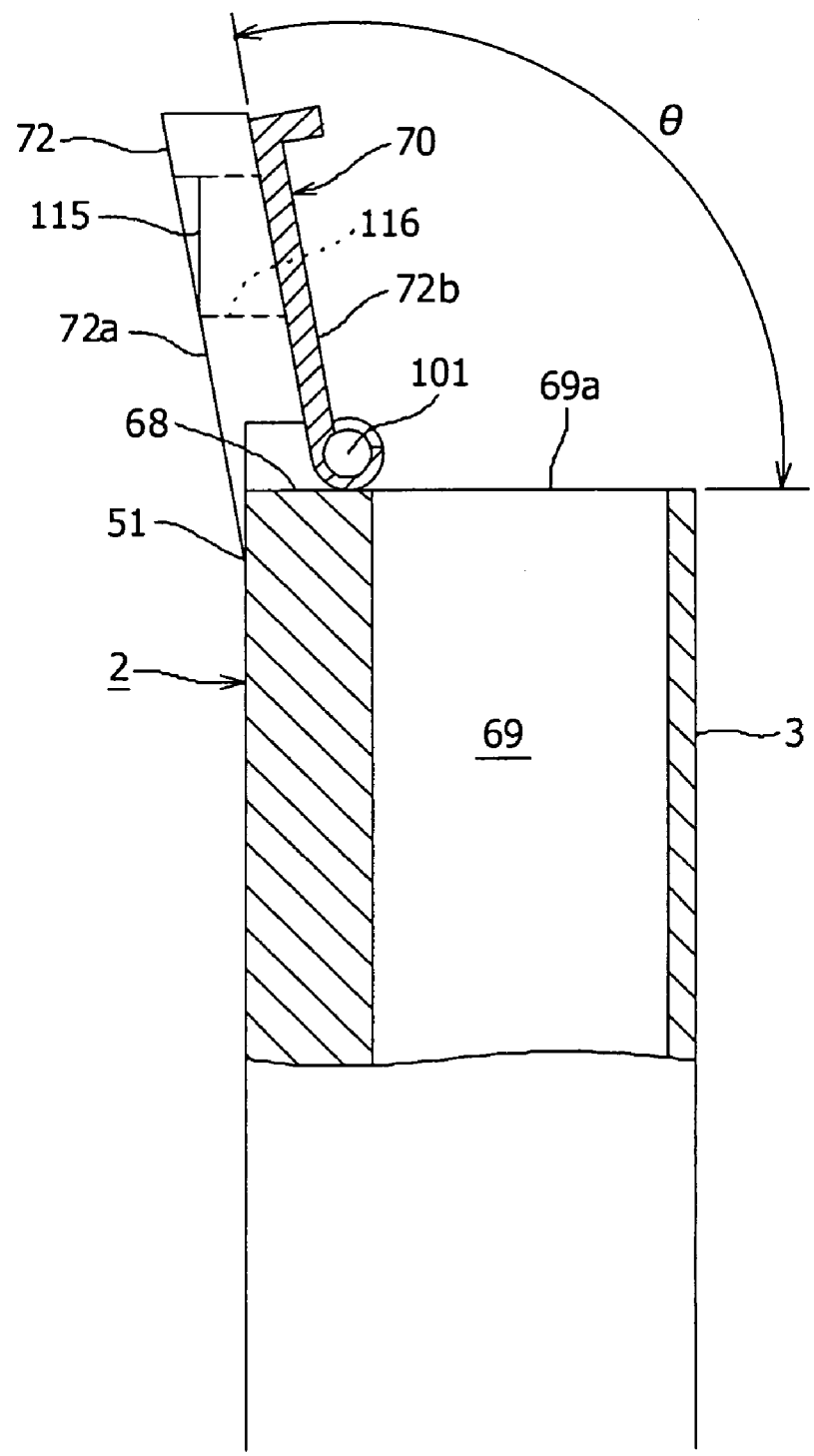
FIG. 18 is a side view of a strap hook.

As shown in FIGS. 2A, 2B, and 18, the strap hook 72 is formed on the end surface 68 of the housing 2 so as to project along one side edge of the end surface 68 connected to the second main surface 51. The strap hook 72 has a first surface 72a connected to the second main surface 51 and a second surface 72b opposite to the first surface 72a. The second surface 72b serves as a support surface for supporting the battery lid 70 in its open condition. The second surface 72b is inclined at an angle θ greater than 90° with respect to the end surface 68 of the housing 2 or the opening 69a of the battery compartment 69. The first surface 72a is formed with an engagement groove 115 for engaging an engagement pawl 127 of a multiconnector 121 to be hereinafter described, so that when the multiconnector 121 is connected to the multiconnector connection terminal 73, the disconnection of the multiconnector 121 from the multiconnector connection terminal 73 can be prevented by the engagement of the engagement pawl 127 and the engagement groove 115. Further, the strap hook 72 is formed with a hole 116 for catching the strap.

Figure 19:
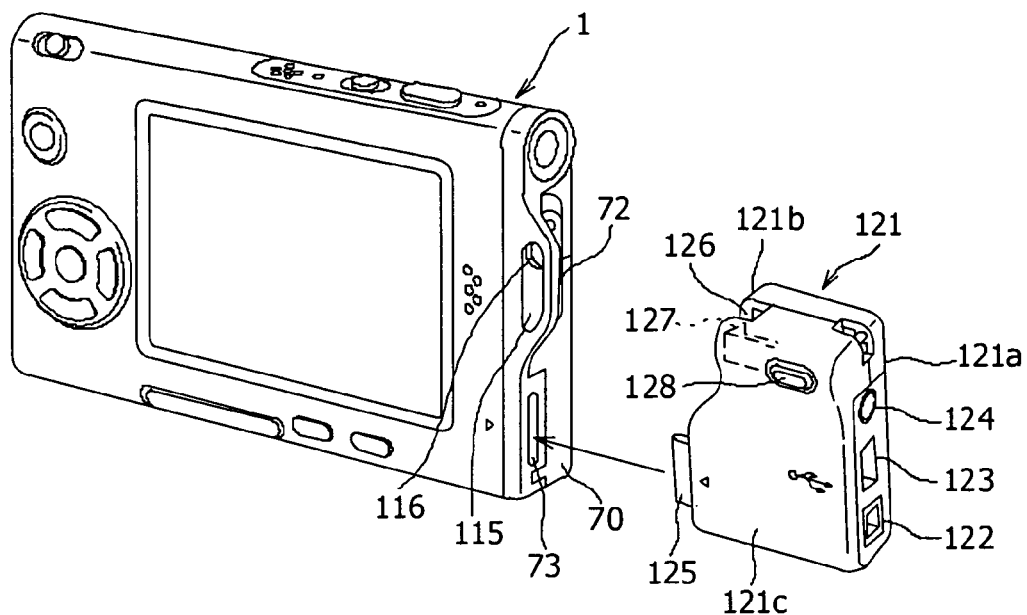
FIG. 19 is a perspective view of a multiconnector adapted to be connected to the digital camera.
Figure 20:
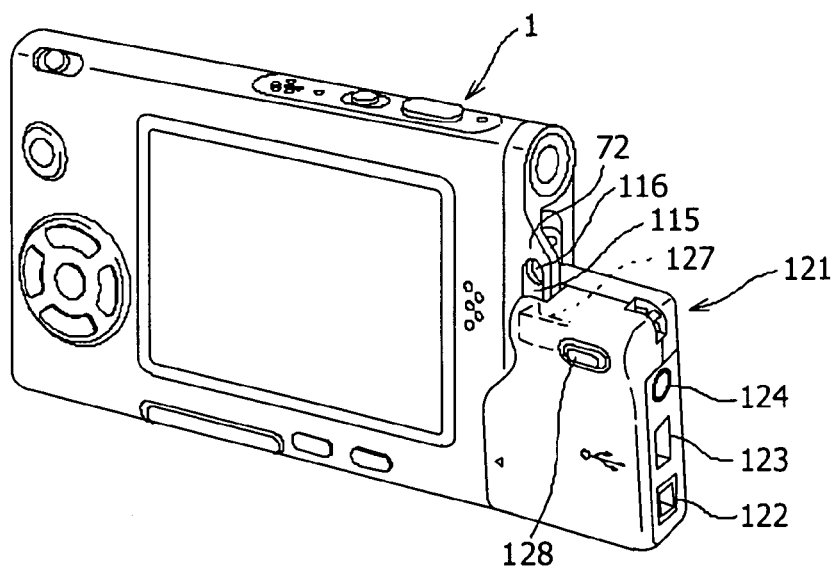
FIG. 20 is a view similar to FIG. 19, showing a connected condition of the multiconnector to the digital camera.

FIG. 19 shows the multiconnector 121 adapted to be connected to the multiconnector connection terminal 73. The multiconnector 121 has a first side surface 121a, a second side surface 121b opposite to the first side surface 121a, and a third side surface 121c connecting the first side surface 121a and the second side surface 121b. The first side surface 121a is provided with a DC input terminal 122, a USV terminal 123, and an A/V output terminal 124. The second side surface 121b is provided with a terminal 125 adapted to be inserted into the multiconnector connection terminal 73 and a strap hook insert recess 126 into which the strap hook 72 is adapted to be inserted. Further, the engagement pawl 127 for engaging the engagement groove 115 of the strap hook 72 is exposed to the inner surface of the strap hook insert recess 126. The third side surface 121c is provided with a pawl release button 128 for disengaging the engagement pawl 127 from the engagement groove 115.

When the terminal 125 of the multiconnector 121 is inserted into the multiconnector connection terminal 73 of the camera 1 from the right side thereof as shown in FIG. 19, the strap hook 72 of the camera 1 is simultaneously inserted into the strap hook insert recess 126 of the multiconnector 121, and the engagement pawl 127 in the insert recess 126 is engaged into the engagement groove 115 of the strap hook 72, thereby locking the multiconnector 121 to the camera 1.

Figure 21:
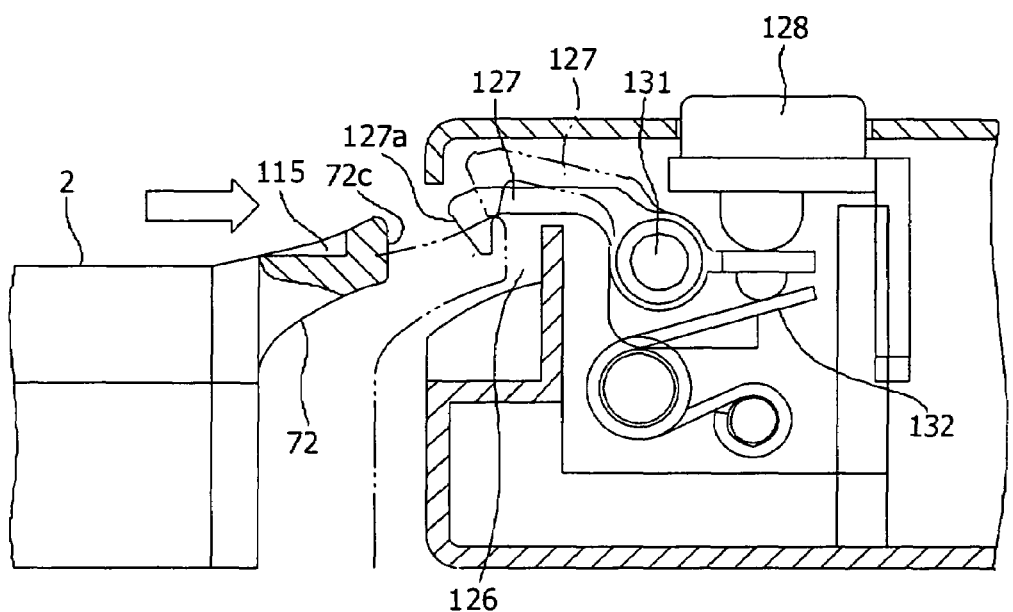
FIG. 21 is a sectional view showing a locking operation of the multiconnector to the strap hook.

FIG. 21 is a sectional view of an essential part of the multiconnector 121. The engagement pawl 127 is pivotably supported to a shaft 131 and is normally projected into the strap hook insert recess 126 by a spring 132. When the strap hook 72 is inserted into the strap hook insert recess 126, an inclined front end surface 127a of the engagement pawl 127 is pushed by a front end surface 72c of the strap hook 72 to thereby generate a clockwise rotational force of the engagement pawl 127 about the shaft 131 against a biasing force of the spring 132 as viewed in FIG. 21. When the strap hook 72 is fully inserted into the strap hook insert recess 126 to such a position that a force of pushing the inclined front end surface 127a of the engagement pawl 127 by the front end surface 72c of the strap hook 72 is removed, the engagement pawl 127 is automatically rotated counterclockwise about the shaft 131 as viewed in FIG. 21 by the biasing force of the spring 132 to engage the engagement groove 115 of the strap hook 72.

Figure 22:
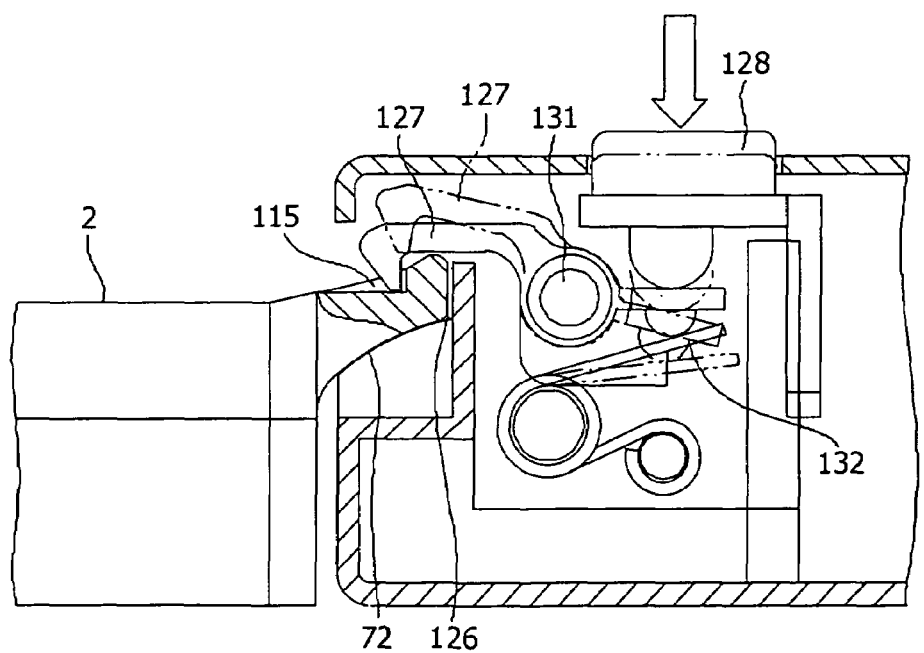
FIG. 22 is a sectional view showing an unlocking operation of the multiconnector from the strap hook.
Figure 23:
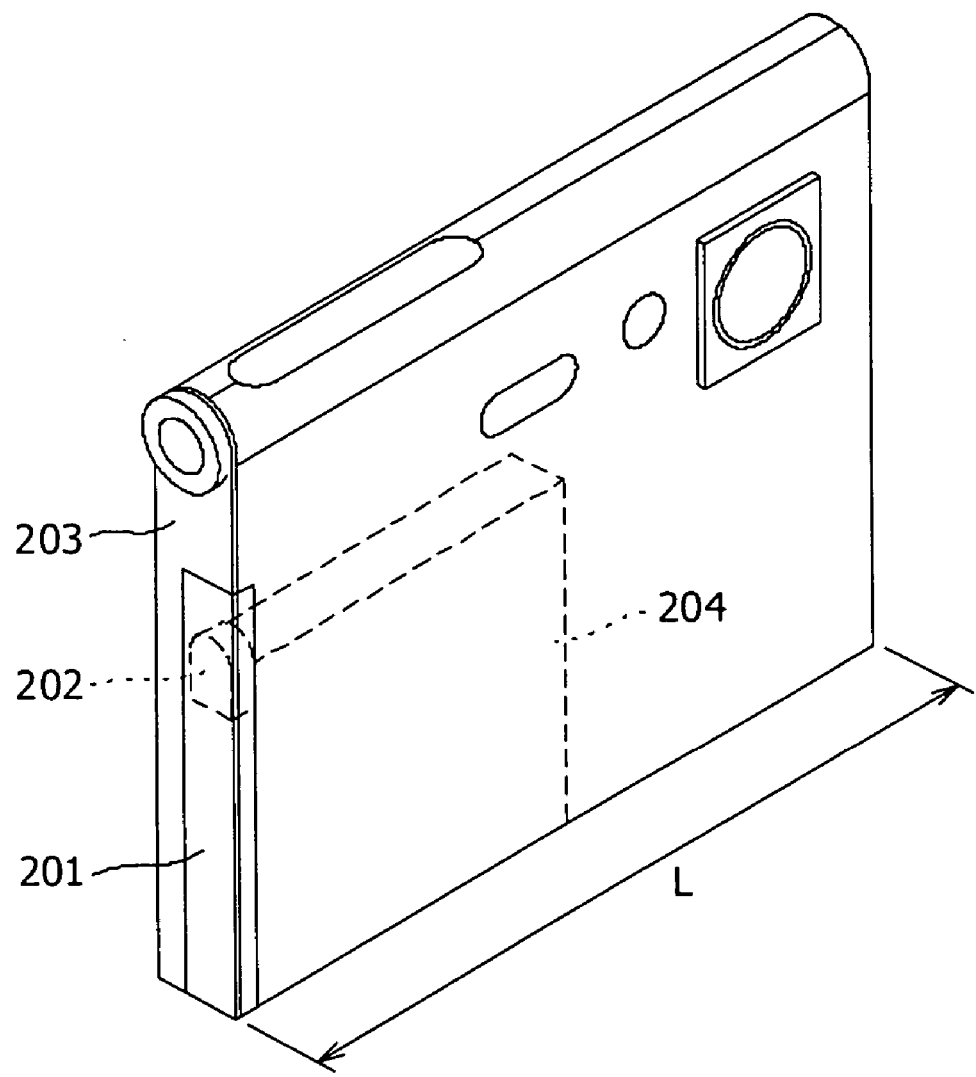
FIG. 23 is a perspective view of an imaging device in the prior art.

In removing the multiconnector 121 from the camera 1, the pawl release button 128 is depressed by the operator. Accordingly, as shown in FIG. 22, the engagement pawl 127 is rotated clockwise by the pawl release button 128 against the biasing force of the spring 132, so that the engagement pawl 127 is disengaged from the engagement groove 115 to thereby allow the removal of the multiconnector 121 from the camera 1.

With such a configuration that the multiconnector 121 is adapted to be engaged with the strap hook 72, the following advantage can be obtained. As compared with such a known structure that a multiconnector is not engaged with a strap hook, a strong force caused by a tension to a cord connected to the multiconnector 121 is not directly applied to a connected portion between the multiconnector 121 and the camera 1, so that the terminal 125 and the multiconnector connection terminal 73 can be protected.

Although there may be a slight difference in radius of curvature of a curved surface or angle of inclination of an inclind surface, for example, throughout the drawings, such a difference is merely due to a manner of illustration, and the same reference numerals denote the same parts throughout the drawings. Further, in any sectional view, the hatch lines are partially omitted.

(10) Operation of Battery Lid and Battery Release Lever

In inserting the battery 111 into the battery compartment 69, the battery lid 70 is first opened and the battery release lever 71 is next retracted against the biasing force of the spring 108. As maintaining this retracted position of the battery release lever 71, the battery 111 is inserted into the battery compartment 69. After fully inserting the battery 111 into the battery compartment 69, the force of maintaining the retracted position of the battery release lever 71 is removed, so that the battery release lever 71 is automatically returned to the advanced position by the biasing force of the spring 108, thus preventing unintentional ejection of the battery 111 from the battery compartment 69. Thereafter, the battery lid 70 is closed to finish the insert operation of the battery 111.

The battery release lever 71 is exposed to the outside of the housing 2 at a position adjacent to the battery lid 70 in its closed condition. Accordingly, there is a possibility of misoperation of the battery release lever 71. However, this possibility can be eliminated by the battery lid engaging portion 113 of the battery release lever 71 and the release lever engaging portion 114 of the battery lid 70. That is, in the closed condition of the battery lid 70, the release lever engaging portion 114 is located adjacent to the battery lid engaging portion 113 as shown in FIG. 15. With this configuration, the battery lid engaging portion 113 of the battery release lever 71 is engaged with the release lever engaging portion 114 of the battery lid 70 to thereby prevent the retraction of the battery release lever 71 in the closed condition of the battery lid 70.

In ejecting the battery 111 from the battery compartment 69, the battery lid 70 is first opened and the battery release lever 71 is next retracted against the biasing force of the spring 108. At this time, the battery 111 is slightly ejected from the battery compartment 69 by the spring force of the battery contact terminals 112 as shown in FIG. 16.

After the battery 111 is slightly ejected from the battery compartment 69 as mentioned above, the battery release lever 71 is moved toward the advanced position to further eject the battery 111 from the battery compartment 69. More specifically, as shown in FIG. 17, the wedged front end 106a of the battery engaging portion 106 of the battery release lever 71 comes into sliding engagement with the wedged portion 111b of the frame 111a of the battery 111, thereby further ejecting the battery 111 from the battery compartment 69.

(11) Other Preferred Embodiments

While the present invention is applied to an imaging device such as a digital camera in the above preferred embodiment, the present invention may be widely applied to any electronic equipment using a battery, such as a mobile phone, mobile game machine, and mobile computer.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An imaging device comprising:
   a flat box-shaped housing having a first main surface, a second main surface opposite to said first main surface, and a first end surface connecting said first main surface and said second main surface;
   an imaging lens provided on said first main surface;
   a monitor provided on said second main surface;
   a battery compartment defined between said first main surface and said second main surface, said battery compartment having an opening exposed to said first end surface for insertion and ejection of a battery;
   a battery release lever provided on said first end surface for allowing the insertion of said battery into said battery compartment having an opening and the ejection of said battery from said battery compartment through said opening; and
   a battery lid provided on said first end surface for opening and closing said opening of said battery compartment; wherein
   said battery release lever is located adjacent to said battery lid to avoid substantially covering said battery release lever when said battery lid is closed, said battery release lever being formed at one end with a battery engaging portion and being slidably mounted on said first end surface so as to be movable between an advanced position where said battery engaging portion of said battery release lever is advanced to close a part of said opening of said battery compartment and a retracted position where said battery engaging portion is retracted to open said part of said opening; said battery release lever being normally biased toward said advanced position by a spring.

2. An imaging device comprising:
   a flat box-shaped housing having a first main surface, a secon main surface opposite to said first main surface, and a first end surface connecting said first main surface and said second main surface;
   an imaging lens provided on said first main surface;
   a monitor provided on said second main surface;
   a battery compartment defined between said first main surface and said second main surface, said battery compartment having an opening exposed to said first end surface for insertion and ejection of a battery;
   a battery release lever provided on said first end surface for allowing the insertion of said battery into said battery compartment through said opening and the ejection of said battery from said battery compartment through said opening; and
   a battery lid provided on said first end surface for opening and closing said opening of said battery compartment, said battery lid being pivotably mounted through a shaft to said housing; and
   said battery release lever being located adjacent to said battery lid to avoid substantially covering said battery release lever when said battery lid is closed;
   wherein, said battery lid is configured to be rotated in a first direction about said shaft, to position said battery lid on said first end surface to close said opening of said battery compartment, whereas when said battery lid is rotated in a second direction opposite to said first direction about said shaft, said battery lid is opened and positioned on a strap hook provided on said first end surface, so that said battery lid is supported in the open position by said strap hook.

3. The imaging device according to claim 2, wherein:
said shaft is provided by a metal bar having elasticity; and
one end portion of said shaft is formed as a spring portion for biasing said battery lid against said first end surface in the closed condition of said battery lid and for biasing said battery lid against said strap hook in the open condition of said battery lid;
said spring portion being formed by a bent portion of said shaft.

4. The imaging device according to claim 1, wherein:
said battery release lever is formed with a battery lid engaging portion; and
said battery lid is formed with a release lever engaging portion adapted to engage with said battery lid engaging portion of said battery release lever;
whereby when said battery lid is in the closed position, said battery lid engaging portion of said battery release lever is engaged with said release lever engaging portion of said battery lid to thereby prevent the retraction of said battery release lever when the battery lid is closed.

5. The imaging device according to claim 1, wherein:
said battery compartment is provided at an innermost end with battery contact terminals having a spring force for slightly ejecting said battery; and
said battery engaging portion of said battery release lever has a battery displacing surface for further ejecting said battery slightly ejected by the spring force of said battery contact terminals.

6. An electronic device comprising:
a battery compartment having an opening for insertion and ejection of a battery;
a strap hook provided adjacent said opening;
a battery release lever for allowing the insertion of said battery into said battery compartment through said opening and the ejection of said battery from said battery compartment through said opening; and
a battery lid for opening and closing said opening of said battery compartment, said battery lid being supported in an open position by said strap hook; and said battery release lever being located adjacent to said battery lid to avoid substantially covering said battery release lever when said battery lid is closed.

7. An electronic device comprising:
a component compartment having an opening for insertion and ejection of a component;
a component release lever for allowing the insertion of said component into said component compartment through said opening and the ejection of said component from said component compartment through said opening, said component release lever being slidably mounted on said compartment to be movable between an advanced position where said component release lever is advanced to close a part of said opening and a retracted position where said component release lever is retracted to open said part of said openein; said component release lever being normally biased toward said advanced position by a spring; and
a lid for opening and closing said opening of said component compartment;
wherein said component release lever is located adjacent to said lid to avoid substantially covering said component release lever when said lid is closed.

* * * * *